(12) United States Patent
Kong et al.

(10) Patent No.: US 11,238,127 B2
(45) Date of Patent: Feb. 1, 2022

(54) ELECTRONIC DEVICE AND METHOD FOR USING CAPTURED IMAGE IN ELECTRONIC DEVICE

(71) Applicant: Samsung Electronics Co., Ltd., Suwon-si (KR)

(72) Inventors: Kyu-Chul Kong, Gumi-si (KR); Bang-Hyun Kwon, Gumi-si (KR); Hyun-Woong Kwon, Daegu (KR); Jeong-Hoon Kim, Gumi-si (KR); Hye-Soon Jeong, Chilgok-gun (KR); Dae-Sung Hwang, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 274 days.

(21) Appl. No.: 16/374,180

(22) Filed: Apr. 3, 2019

(65) Prior Publication Data

US 2019/0228041 A1  Jul. 25, 2019

Related U.S. Application Data

(63) Continuation of application No. 14/453,107, filed on Aug. 6, 2014, now abandoned.

(30) Foreign Application Priority Data

Aug. 23, 2013 (KR) .................. 10-2013-0100713
Apr. 24, 2014 (KR) .................. 10-2014-0049459

(51) Int. Cl.
*G06F 7/00* (2006.01)
*G06F 17/30* (2006.01)
*G06F 16/958* (2019.01)
*G06F 9/451* (2018.01)

(52) U.S. Cl.
CPC ............ *G06F 16/958* (2019.01); *G06F 9/451* (2018.02)

(58) Field of Classification Search
CPC ......... G06F 16/958; G06F 9/451; H04L 67/02
USPC ....................................................... 707/756
See application file for complete search history.

(56) References Cited

U.S. PATENT DOCUMENTS

| 9,369,539 | B2 | 6/2016 | Luna et al. |
| 2002/0032677 | A1 | 3/2002 | Morgenthaler et al. |
| 2004/0046792 | A1 | 3/2004 | Coste et al. |
| 2005/0066267 | A1* | 3/2005 | Kanai .................. G06F 16/88 |
| | | | 715/234 |

(Continued)

FOREIGN PATENT DOCUMENTS

| CN | 102930263 A | 2/2013 |
| CN | 103024589 A | 4/2013 |

(Continued)

OTHER PUBLICATIONS

Snagit On Windows Help, Release 11.0.0, Jan. 2012 (Year: 2012).*

(Continued)

*Primary Examiner* — Bin V Ho
(74) *Attorney, Agent, or Firm* — Jefferson IP Law, LLP

(57) ABSTRACT

An electronic device is provided. The electronic device includes a display configured to display an application execution screen and a controller configured to, when a screen image of the application execution screen is captured, obtain execution path information for executing a state of the captured screen image, and to store the captured screen image and the execution path information.

19 Claims, 24 Drawing Sheets

(56) References Cited

U.S. PATENT DOCUMENTS

| | | |
|---|---|---|
| 2005/0289176 A1 | 12/2005 | Johnston et al. |
| 2007/0035616 A1 | 2/2007 | Lee et al. |
| 2007/0192446 A1 | 8/2007 | Ivory et al. |
| 2007/0195344 A1 | 8/2007 | Mochizuki et al. |
| 2008/0201307 A1 | 8/2008 | Swartz |
| 2008/0232690 A1 | 9/2008 | Saund et al. |
| 2009/0031227 A1* | 1/2009 | Chakrabarti ............ G06F 9/451 715/763 |
| 2009/0115863 A1 | 5/2009 | Lee |
| 2009/0158346 A1 | 6/2009 | Zer et al. |
| 2009/0249189 A1 | 10/2009 | Jania et al. |
| 2010/0042943 A1 | 2/2010 | Morris |
| 2011/0154219 A1 | 6/2011 | Khalatian |
| 2012/0117168 A1 | 5/2012 | Sugiyama et al. |
| 2012/0185066 A1 | 7/2012 | Kern et al. |
| 2012/0200716 A1 | 8/2012 | Torikai et al. |
| 2012/0221946 A1* | 8/2012 | Dovey .................... G06F 9/451 715/273 |
| 2012/0269394 A1 | 10/2012 | Kern et al. |
| 2012/0272139 A1 | 10/2012 | Kern et al. |
| 2012/0302167 A1* | 11/2012 | Yun ...................... G06F 3/0416 455/41.2 |
| 2012/0310882 A1 | 12/2012 | Werner et al. |
| 2013/0013699 A1 | 1/2013 | Huxley |
| 2013/0038527 A1 | 2/2013 | Komai |
| 2013/0080785 A1* | 3/2013 | Ruhlen ............... H04L 67/1002 713/176 |
| 2013/0104023 A1* | 4/2013 | Nielsen ................ G06F 40/169 715/233 |
| 2013/0191774 A1 | 7/2013 | Choi et al. |
| 2014/0063311 A1 | 3/2014 | Mccauley et al. |
| 2014/0176536 A1 | 6/2014 | Kern et al. |
| 2014/0240440 A1 | 8/2014 | Seo et al. |
| 2014/0250497 A1 | 9/2014 | Rinne et al. |
| 2014/0317483 A1 | 10/2014 | Wang |
| 2014/0354559 A1 | 12/2014 | Terunuma et al. |
| 2014/0364158 A1 | 12/2014 | Hwang et al. |
| 2015/0067721 A1* | 3/2015 | Cadena Vedova .... H04W 80/12 725/32 |
| 2015/0208217 A1 | 7/2015 | Hong et al. |

FOREIGN PATENT DOCUMENTS

| | | |
|---|---|---|
| CN | 103077171 A | 5/2013 |
| CN | 103248939 A | 8/2013 |
| EP | 2 477 130 A1 | 7/2012 |
| JP | 2010-160748 A | 7/2010 |

OTHER PUBLICATIONS

Samsung Galaxy Note GT-N7000 User Manual, Nov. 2011 (Year: 2011).*
Snagit On Windows Help, Release 11.0.0, Jan. 2012.
"Samsung Galaxy Note GT-N7000 User Manual", Nov. 2011.
Ed Rhee, Take, Edit Screenshots on Galaxy Note Devices with the S Pen, CNET: Tech Culture, Aug. 21, 2013, pp. 1-10, http://www.cnet.com/how-to/take-edit-screenshots-on-galaxy-note-devices-with-the-s-pen/, retrieved Apr. 12, 2014.
Chinese Office Action dated Apr. 18, 2018, issued in Chinese Application No. 201410422106.0.
European Office Action dated Dec. 18, 2014; Reference #: RGJ/P218758EP; Application/Patent #: 14181995.3-1957.
Chinese Office Action dated Jan. 17, 2019; Chinese Patent Application No. 201410422106.0.

* cited by examiner

Class Object

- URI
- String
- Boolean
- byte(binary)
- Short
- Integer
- Float
- Double
- Date
- Time
- Class Object

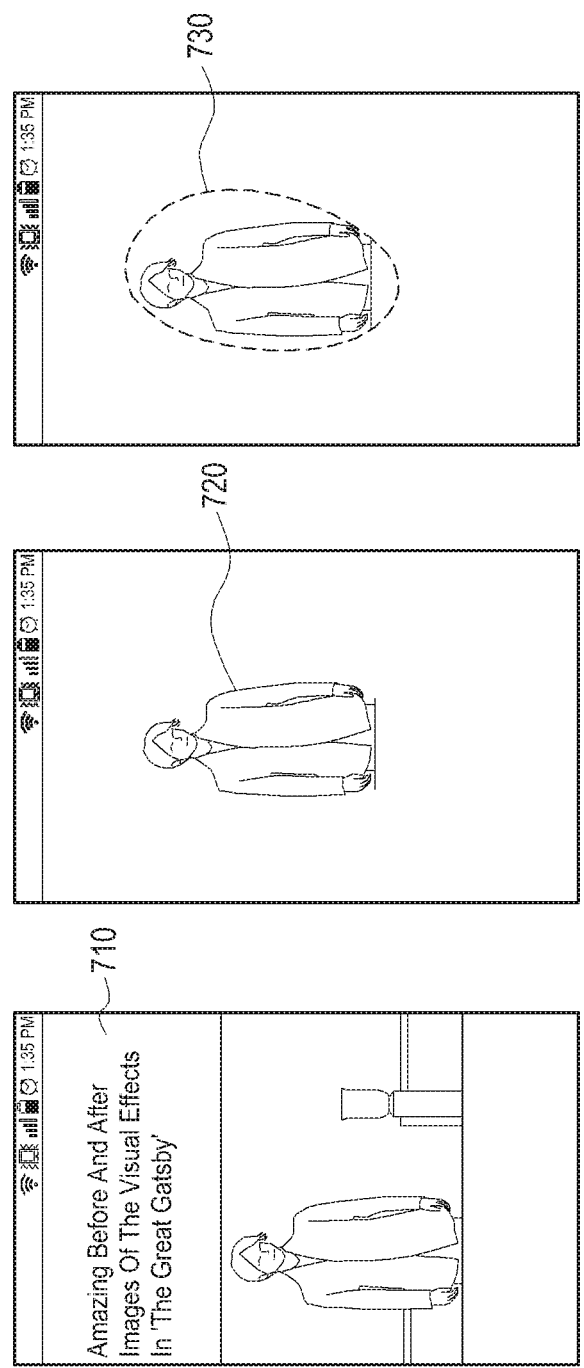

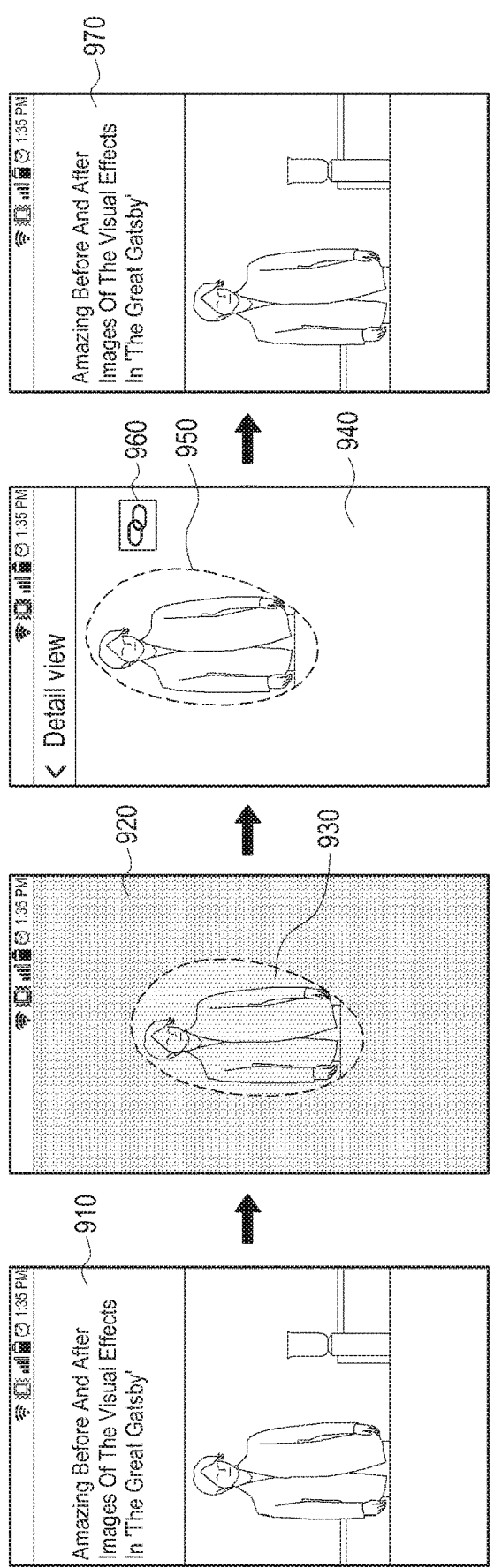

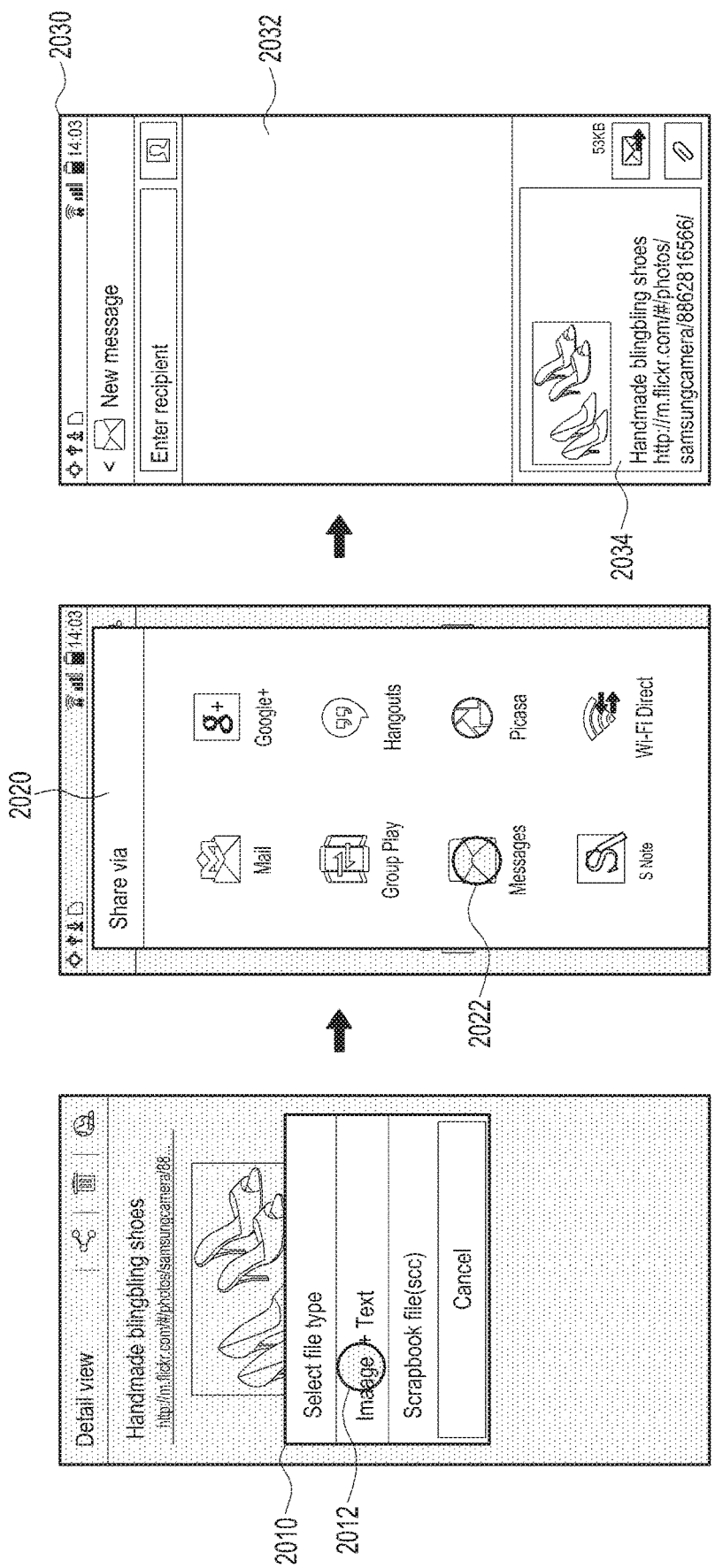

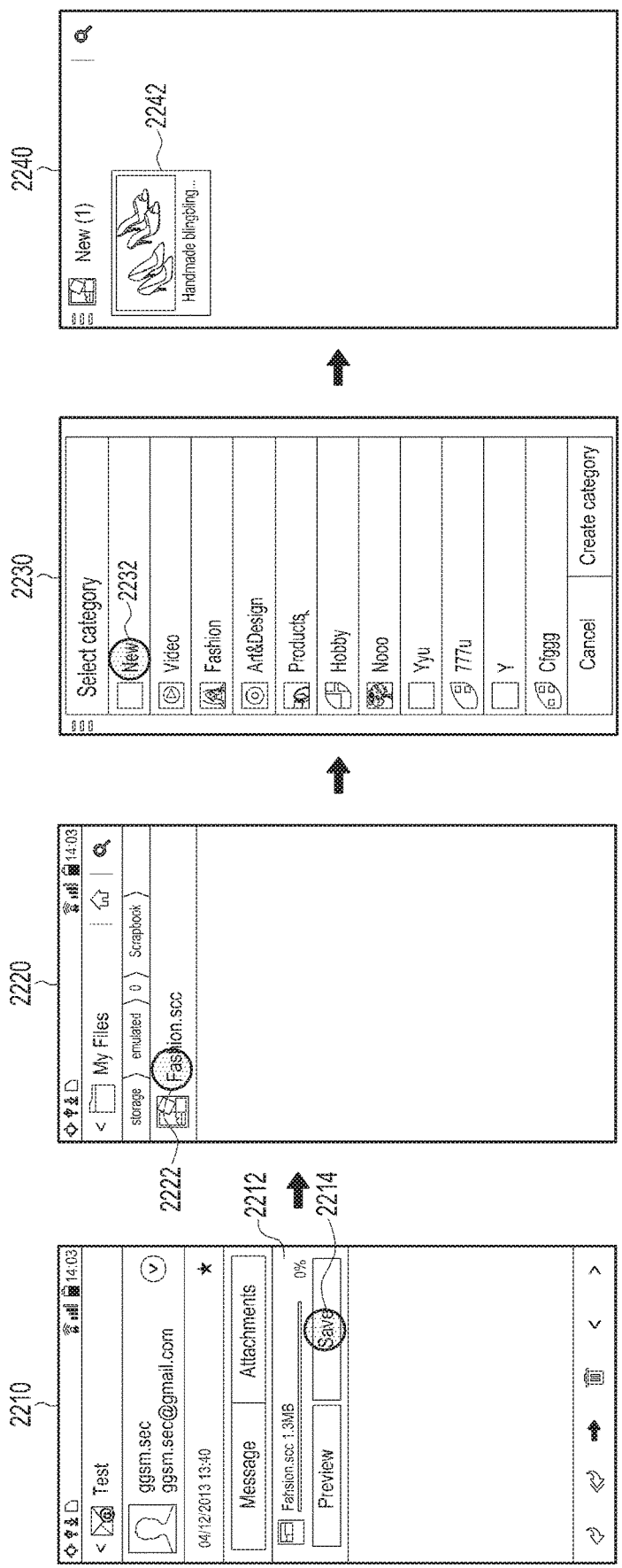

META-INF

```
2402 — "category_name":"My scraps",
2404 — "contents":
       [
         {
2406 —     "type":"image",
2408 —     "thumbnail":"/content/1.png",
2410 —     "crop_image_path":"/content/image1.png",
2412 —     "crop_image_width":"590",
2414 —     "crop_image_height":"596",
2416 —     "crop_time":"1375091328749",
2418 —     "crop_shape":"0", 2420 —     "metaObjs":
             [
2422 —         {"meta_key":"plain_text","meta_value":"this is text data"}
             ]
         },
         {
           "type":"video",
           "thumbnail":"/content/3.png",
           "crop_image_width":"660",
           .....
         }
       ]
```

FIG.24

| Meta key | Meta value | Meta value Type |
|---|---|---|
| title | Short text<br>- Web : Title of browser<br>- Youtube : Video Title<br>- Music/Video : File name | TEXT |
| plain_text | Text | TEXT |
| app_deep_link | Store uri information for restoring screen of app | TEXT |
| url | URL information<br>- Web : Web page url<br>- Youtube : Youtube video url | TEXT |
| file_path_audio | Original path of music file | TEXT |
| file_path_video | Original path of video file | TEXT |
| file_path_image | Original path of image file | TEXT |
| file_path_drawing_memo | Drawing memo png file path (text) and rect information (blob) where drawing memo is located in entire area | TEXT & BLOB |
| file_path_spd | Drawing memo file path (spd file) | TEXT |
| dm_hand_write_text | Store hand writing results recognized from stroke manager | TEXT |
| location | Location information(Latitude, Longitude)<br>- "35.8418305, 127.1236459" | TEXT |

FIG.25

ELECTRONIC DEVICE AND METHOD FOR USING CAPTURED IMAGE IN ELECTRONIC DEVICE

CROSS-REFERENCE TO RELATED APPLICATION(S)

This application is a continuation application of prior application Ser. No. 14/453,107, filed on Aug. 6, 2014, and was based on and claimed priority under 35 U.S.C. § 119(a) of a Korean patent application filed on Aug. 23, 2013 in the Korean Intellectual Property Office and assigned Serial number 10-2013-0100713, and of a Korean patent application filed on Apr. 24, 2014 in the Korean Intellectual Property Office and assigned Serial number 10-2014-0049459, the entire disclosure of each of which is hereby incorporated by reference.

TECHNICAL FIELD

The present disclosure relates to an electronic device and technology for using captured images in an electronic device.

BACKGROUND

Currently, electronic devices have been developed as portable terminals that users may carry with them, and functions of the electronic devices have been diversified.

Accordingly, various functions for user's convenience are built in an electronic device, and the electronic device may activate each of the functions depending on the user's manipulation for each of the functions, so the function may be executed.

For example, if an electronic device has a built-in capture function, the electronic device may capture various screens displayed on the electronic device using the capture function, and store the captured images.

However, the conventional screen capture function may simply store captured images as images, and there are not many ways to use the captured images. For example, the captured images may be simply used for image processing, such as used for copying and pasting, or for using objects in the captured images.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of using a captured image in a variety of ways, and a method for using a captured image in the electronic device.

Another aspect of the present disclosure is to provide an electronic device for storing a captured screen image together with execution path information for executing the screen that was displayed during the screen capture, to make it possible to execute later on the screen that was displayed during the screen capture using the captured screen image, and a method for using a captured image in the electronic device.

Another aspect of the present disclosure is to provide an electronic device for sharing a captured screen image and execution path information for executing the screen that was displayed during the screen capture in an electronic device of a user, with another electronic device of the same user or an electronic device of another user, thereby making it possible to execute the screen that was displayed during the screen capture using the captured screen image even in another electronic device of the same user or an electronic device of another user, and a method for using a captured image in the electronic device.

In accordance with an aspect of the present disclosure, an electronic device is provided. The electronic device includes a display configured to display an application execution screen and a controller configured to, when a screen image of the application execution screen is captured, obtain execution path information for executing a state of the captured screen image, and to store the captured screen image and the execution path information.

In accordance with another aspect of the present disclosure, a method for using a captured screen in an electronic device is provided. The method includes capturing a screen image of an application execution screen, obtaining execution path information for executing a state of the captured screen image, and storing the captured screen image and the execution path information.

In accordance with further another aspect of the present disclosure, a non-transitory storage medium storing a program for using a captured screen is provided. The program executed in a controller of an electronic device includes a command to perform a method. The method includes capturing a screen image of an application execution screen, obtaining execution path information for executing a state of the captured screen image, storing the captured screen image and the execution path information, and transmitting the captured screen image and the execution path information to share the captured screen image and the execution path information.

In accordance with another aspect of the present disclosure, a data sharing server is provided. The data sharing server includes a storage unit configured to store data including a captured screen image and execution path information corresponding to the captured screen image, the data being uploaded from a first electronic device and a controller configured to, when the data is uploaded, transmit the stored data to a second electronic device that accesses the data sharing server with the same account as that of the first electronic device.

In accordance with still another aspect of the present disclosure, a data sharing server is provided. The data sharing server includes a storage unit configured to store data including a captured screen image and execution path information corresponding to the captured screen image, the data being uploaded from a first electronic device and a controller configured to transmit a Uniform Resource Locator (URL) of uploaded data to the first electronic device when the data is uploaded, and to transmit the uploaded data to a second electronic device upon receiving a data request made based on the URL of the uploaded data from the second electronic device that has received the URL of the uploaded data from the first electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A, 7B, and 7C illustrate an example of an operation of selecting at least a part of a captured screen according to an embodiment of the present disclosure;

FIGS. 9A, 9B, 9C, and 9D illustrate an example of using a captured image during execution of a web browser application in an electronic device according to an embodiment of the present disclosure;

FIGS. 19A, 19B, 19C, 20A, 20B, 20C, 21A, 21B, 21C, 22A, 22B, 22C, and 22D illustrate user interface screens for sharing a captured image and execution path information corresponding to the captured image in an electronic device according to an embodiment of the present disclosure;

FIG. 24 illustrates META-INF included in an SCC file according to an embodiment of the present disclosure; and FIG. 25 illustrates metadata according to an embodiment of the present disclosure.

Throughout the drawings, like reference numerals will be understood to refer to like parts, components, and structures.

DETAILED DESCRIPTION

Figure 1:
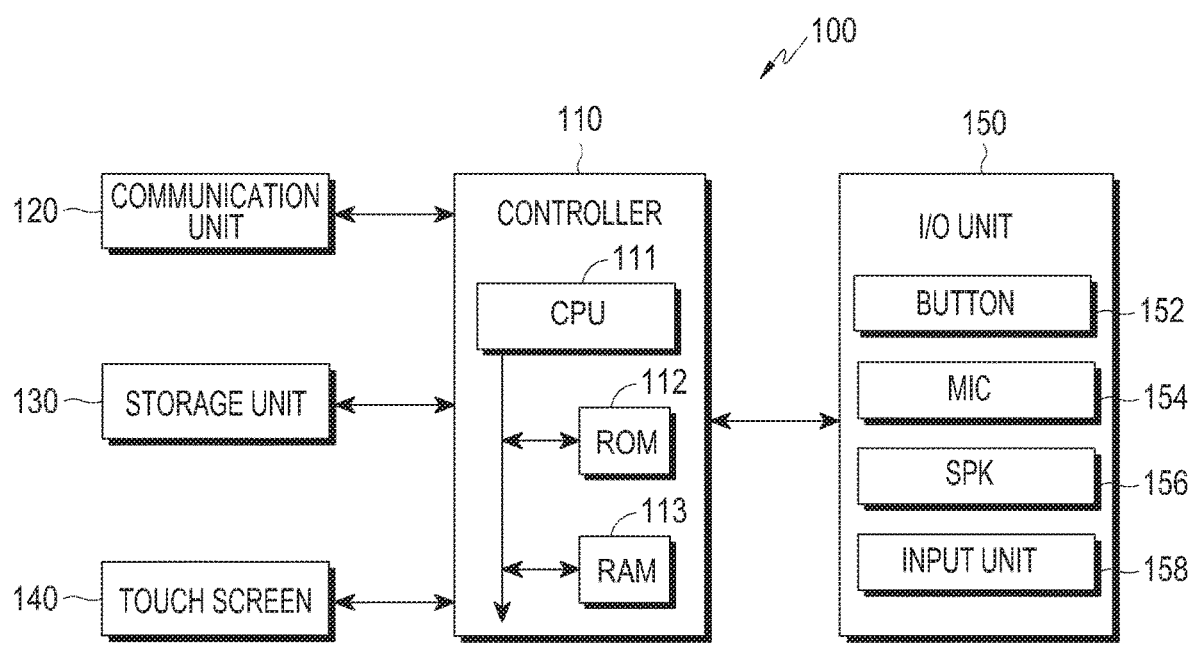
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various embodiments of the present disclosure may include any device having a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, and a wearable device (e.g., a Head Mounted Device (HMD) (such as electronic eyeglasses), electronic apparel, an electronic bracelet, an electronic necklace, an electronic appcessory, an electronic tattoo, a smartwatch and the like).

In accordance with certain embodiments of the present disclosure, an electronic device may be a smart home appliance having a broadcast channel reception function. The smart home appliance may include, for example, at least one of a TeleVision (TV), a Digital Versatile Disk (DVD) player, an audio set, a refrigerator, an air conditioner, a cleaner, an oven, a microwave oven, a washer, an air cleaner, a set top box, a TV box (e.g., Samsung HomeSync™, Apple TV™, or Google TV™), a game console, an electronic dictionary, an electronic key, a camcorder, an electronic photo frame, or the like.

In accordance with certain embodiments of the present disclosure, an electronic device may include at least one of various medical devices (e.g., Magnetic Resonance Angiography (MRA), Magnetic Resonance Imaging (MRI), Computed Tomography (CT), medical camcorder, ultrasonic equipment and the like) having a broadcast channel reception function, a navigation device, a Global Positioning System (GPS) receiver, an Event Data Recorder (EDR), a Flight Data Recorder (FDR), an automotive infotainment device, marine electronic equipment (e.g., marine navigation system, gyro compass and the like), avionics, security equipment, an industrial or household robot, and the like.

In accordance with certain embodiments of the present disclosure, an electronic device may include at least one of a part of the furniture or building/structure having a broadcast channel reception function, an electronic board, an electronic signature receiving device, a projector, or various measurement devices (e.g., tap water measurement device, electricity measurement device, gas measurement device, radio wave measurement device, and the like). An electronic device according to various embodiments of the present disclosure may be one of the above various devices, or a combination thereof. It will be apparent to those of ordinary skill in the art that an electronic device according to various embodiments of the present disclosure is not limited to the above-described devices.

An electronic device according to various embodiments of the present disclosure will now be described with reference to the accompanying drawings. The term 'user' as used in various embodiments of the present disclosure may refer to a person who uses an electronic device, or a device (e.g., an artificial electronic device) that uses the electronic device.

FIG. 1 is a block diagram of an electronic device according to an embodiment of the present disclosure.

Referring to FIG. 1, an electronic device 100 may include a controller 110, a communication unit 120, a storage unit 130, a touch screen 140, and an Input/Output (I/O) unit 150, but is not limited thereto.

The controller 110 may include a Central Processor Unit (CPU) 111. In addition, the controller 110 may include a Digital Signal Processor (DSP) (not shown), and may also include a Read Only Memory (ROM) 112 storing a control program for control of the electronic device 100, and a Random Access Memory (RAM) 113 that temporarily stores the signals or data received from the outside of the electronic device 100, or is used as a workspace for operations executed in the electronic device 100. The CPU 111 may include a single-core processor, a dual-core processor, a triple-core processor, a quad-core processor, or the like. The CPU 111, the ROM 112 and the RAM 113 may be interconnected through an internal bus.

The controller 110 may control the communication unit 120, the storage unit 130, the touch screen 140 and the I/O unit 150. In other words, the controller 110 may perform the overall control function for the electronic device 100, and may control a signal flow between the components of the electronic device 100.

For example, the controller 110 may display an application screen on the touch screen 140 in response to execution of an application according to an embodiment of the present disclosure. The controller 110 may perform screen capture on the application screen displayed on the touch screen 140. For example, the controller 110 may continuously display application screens on the touch screen 140 in response to execution of an application during the execution of the application, and capture a requested application screen among the application screens. In addition, the controller 110 may obtain execution path information corresponding to the captured screen, and the execution path information corresponding to the captured screen may include information for executing a state of the captured screen.

For example, the controller 110, which includes an application framework and an application, may execute the application using execution path information obtained through the application framework or the application, display screens associated with execution of the application, and obtain execution path information corresponding to the captured application screen. The controller 110 may store execution path information corresponding to the captured screen together with an image of the whole or a selected part of the captured screen. If the stored image is selected, the controller 110 may detect execution path information corresponding to the selected image, and perform a process corresponding to the selected image using the execution path information.

The communication unit 120 may connect the electronic device 100 to external devices (not shown). The external devices may include another device (not shown), a cellular phone (not shown), a smart phone (not shown), a tablet PC (not shown), and a server (not shown). The communication unit 120, under control of the controller 110, may connect the electronic device 100 to external devices through mobile communication, using one or multiple antennas (not shown). The communication unit 120 may transmit and receive wireless signals for voice calls, video calls, Short Message Service (SMS) messages or Multimedia Messaging Service (MMS) messages, to/from a cellular phone (not shown), a smart phone (not shown), a tablet PC (not shown) or another device (not shown), a phone number of each of which is entered or registered in the electronic device 100. The communication unit 120 may further include at least one of a Wireless Local Area Network (WLAN) module (not shown) and a short-range communication module (not shown). The WLAN module, under control of the controller 110, may access the Internet in the place where a wireless Access Point (AP) (not shown) is installed. The WLAN module may support the WLAN standard IEEE802.11x proposed by Institute of Electrical and Electronics Engineers (IEEE). The WLAN module, under control of the controller 110, may enable wireless short-range communication between the electronic device 100 and an image forming apparatus (not shown). The short-range communication scheme may include Bluetooth, Infrared Data Association (IrDA) and the like.

The storage unit 130, under control of the controller 110, may store the signals or data which are input/output in response to operations of the communication unit 120, the touch screen 140 and the I/O unit 150. The storage unit 130 may store a plurality of programs and applications for control of the electronic device 100 or the controller 110, and the program and data for executing various functions. The storage unit 130 may store an image of the whole or at least a part of a captured screen according to an embodiment of the present disclosure, and may store a program for using a captured image mentioned in the present disclosure.

The term 'storage unit' as used herein may be construed to include the ROM 112 and RAM 113 in the controller 110, or a memory card (not shown) (e.g., Secure Digital (SD) card, a memory stick and the like) mounted in the electronic device 100. The storage unit 130 may include a nonvolatile memory, a volatile memory, a Hard Disk Drive (HDD), a Solid State Drive (SSD) or the like.

The storage unit 130 may be a machine (e.g., computer)-readable medium, and the term 'machine-readable medium' may refer to a medium that provides data to machine so that the machine may perform a specific function. The machine-readable medium may be storage medium. The storage unit 130 may include nonvolatile media and volatile media. All of these media should be configured such that commands carried by the media may be detected by the physical mechanism that reads the commands by the machine. The machine-readable medium may include, though not limited thereto, at least one of floppy disk, flexible disk, hard disk, magnetic tape, Compact Disc Read Only Memory (CD ROM), optical disk, punch card, paper tape, RAM, Programmable Read Only Memory (PROM), Erasable PROM (EPROM), and flash EPROM.

The I/O unit 150 may include a button(s) 152, a MICrophone (MIC) 154, a SPeaKer (SPK) 156, and an input unit 158. In addition, to the I/O unit 150 may be provided a cursor controller such as a mouse, a trackball, a joystick, cursor direction keys or the like, for communication with the controller 110 and for control of the movement of a cursor on the touch screen 140.

The microphone 154, under control of the controller 110, may generate an electrical signal by receiving voices or sounds from various sound sources.

The speaker 156, under control of the controller 110, may output sounds corresponding to various signals (e.g., wireless signal, broadcast signal, digital audio file, digital video file and the like) generated by the communication unit 120 or the execution of an application, to the outside of the electronic device 100.

The input unit 158 may be a device or object that is kept inside the electronic device 100, or separately configured. When kept inside the electronic device 100, the input unit 158 may be drawn out or detached from the electronic device 100. The input unit 158 may be an input means for making a proximity or touch input onto the touch screen 140, such as a stylus pen (hereinafter referred to as a 'pen'), or may be a user's finger(s).

The touch screen 140 may be a display, and may provide Graphic User Interfaces (GUIs) to the user during execution of various applications. For example, the touch screen 140 may receive various gesture inputs such as proximity or touch input through, for example, the user's body (e.g., fingers including the thumb) or the pen (e.g., the input unit 158). The touch screen 140 may be implemented in, for example, a resistive type, a capacitive type, an infrared type, or an acoustic wave type. In accordance with an embodiment of the present disclosure, the touch screen 140, under control of the controller 110, may display screens associated with execution of an application and their captured screens, and may display at least a part of the captured screen.

Figure 2:
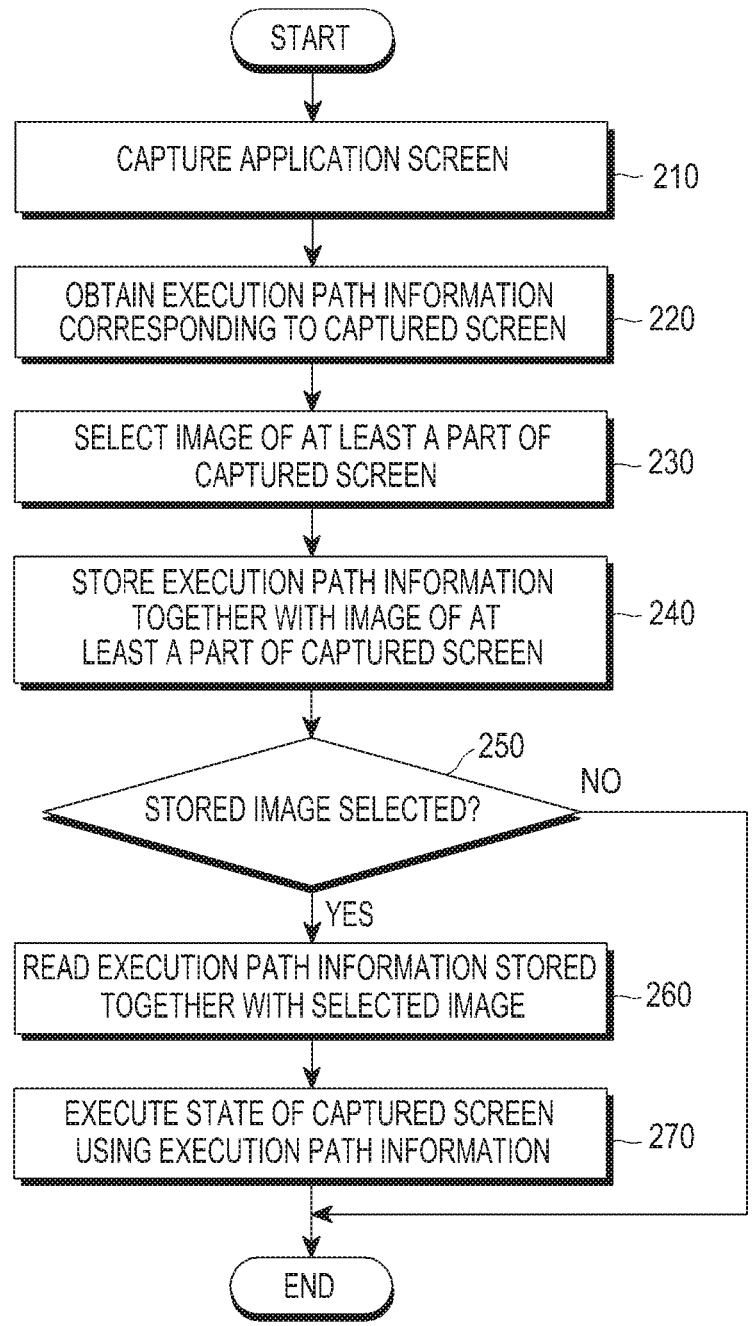
FIG. 2 is a flowchart illustrating an operation of using a captured image in an electronic device according to an embodiment of the present disclosure.

FIG. 2 is a flowchart illustrating an operation of using a captured image in an electronic device 100 according to an embodiment of the present disclosure.

Referring to FIG. 2, the electronic device 100 may capture an application screen in operation 210.

For example, the electronic device 100 may capture the currently displayed application screen in response to a screen capture request from the user during the execution of an application.

Specifically, the electronic device 100 may capture the currently displayed web page screen in response to a screen capture request from the user during the execution of a web browsing application, or may capture the currently displayed music playback screen in response to a screen capture request from the user during the execution of a music playback application. In addition, the electronic device 100 may capture the currently displayed clip screen in response to a screen capture request from the user during the execution of a clip application.

In operation 220, the electronic device 100 may obtain execution path information corresponding to the captured screen. The execution path information may include information for executing a state of the captured screen.

For example, the electronic device 100 may obtain execution path information corresponding to the captured application screen, using an application framework and an application.

Figure 3:
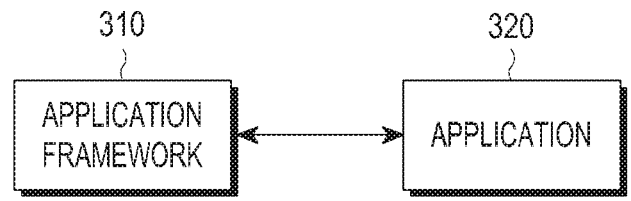
FIG. 3 illustrates an application framework and an application according to an embodiment of the present disclosure.

FIG. 3 illustrates an application framework and an application according to an embodiment of the present disclosure.

Referring to FIG. 3, an application framework 310 may be a collection of a class and a library for implementing the standard structure of an application program. The application framework 310 may include numerous common class objects that may be used in common in various applications, and internal class objects that may be used in a specific application. The application framework 310 may execute an application 320 so that screens associated with the execution of an application may be displayed on the touch screen 140. The application framework 310 may be a framework based on the Android™ Operating System (OS), or a framework based on iOS™. The application framework 310 may be a framework based on any other OSs for electronic devices.

In accordance with an embodiment of the present disclosure, the electronic device 100 may obtain execution path information corresponding to a captured application screen through the application framework 310, or may obtain execution path information corresponding to a captured application screen through the application 320.

Figure 4:
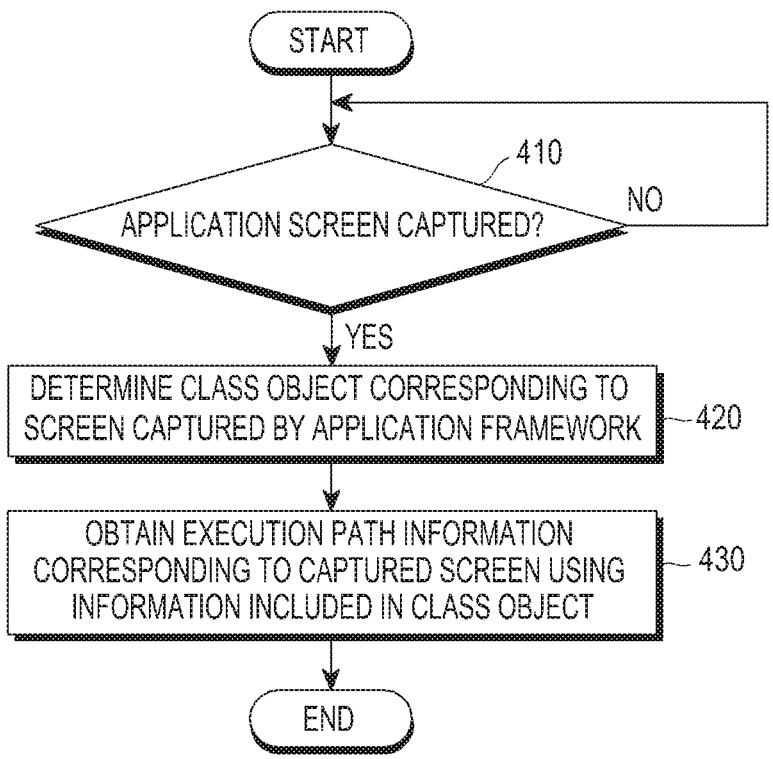
FIG. 4 is a flowchart illustrating an operation of obtaining execution path information through an application framework according to an embodiment of the present disclosure.

FIG. 4 is a flowchart illustrating an operation of obtaining execution path information through an application framework 310 according to an embodiment of the present disclosure.

Referring to FIG. 4, the application framework 310 may determine in operation 410 whether an application screen is captured.

If an application screen is captured during the execution of an application, the application framework 310 may determine a class object corresponding to the captured screen among the numerous class objects in operation 420.

In operation 430, the application framework 310 may obtain execution path information using the information included in the class object corresponding to the captured screen.

For example, the application framework 310 may obtain execution path information by extracting the information needed to execute a state of the captured screen, from the information included in the class object.

Figures 5, 6:
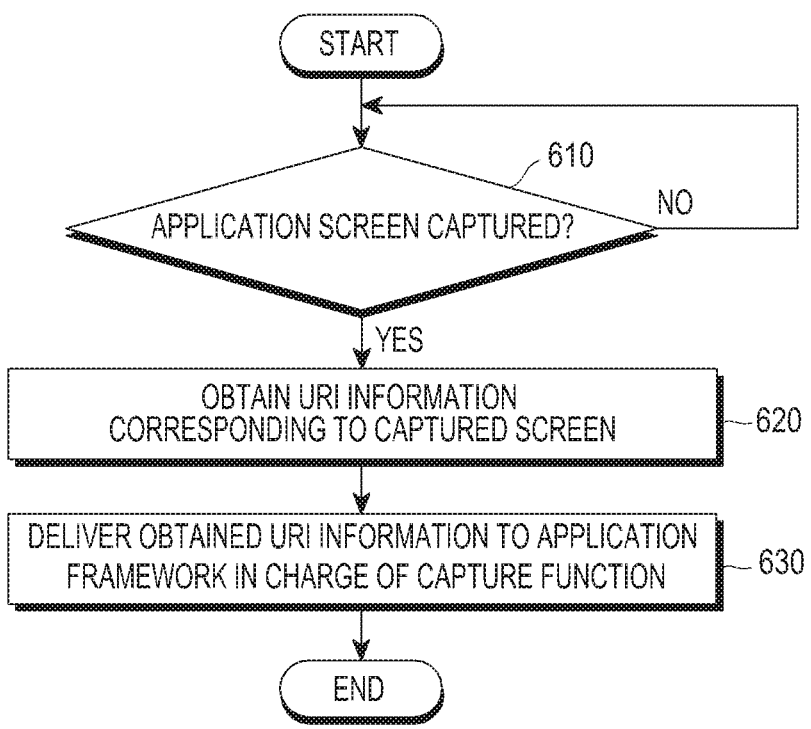
FIG. 5 illustrates an example of information needed to execute a state of a captured screen, in the information that may be included in a class object according to an embodiment of the present disclosure.
FIG. 6 is a flowchart illustrating an operation of obtaining execution path information through an application according to an embodiment of the present disclosure.

FIG. 5 illustrates an example of information needed to execute a state of a captured screen, in the information that may be included in a class object according to an embodiment of the present disclosure.

Referring to FIG. 5, information needed to execute a state of a captured screen, in the information that may be included in a class object, may include information such as Uniform Resource Identifier (URI), String, Boolean, byte (binary), Short, Integer, Float, Double, Date, Time, Class Object and the like. In addition, any information is possible as long as the information is the related information for executing a captured screen.

URI may be URI information corresponding to the screen that was displayed during the execution of the captured screen. String may be string information that was displayed during the execution of the captured screen. For example, String may include text information including a phone number-related name, a phone number-related application name and the like, which were displayed during the execution of display of a phone number. Boolean may include decision parameter value information (true, false) of an application. Byte (binary) may be binary data information. The binary data information may be information obtained by binarizing the information that was displayed (or used) during the execution of the captured screen, such as an image file, texts and the like. Short, which is short-length byte variable information, may include information about an integer within a small range, which was displayed (or used) during the execution of the captured screen. Integer, which is information about a number of 0 to 255, may include information about a number, which was displayed (or used) during the execution of the captured screen. Float, which is information about a decimal point number, may include information about a decimal point number, which was displayed (or used) during the execution of the captured screen. Double, which is information about a decimal point number, the number of digits of which is large, may include information about a decimal point number, which was used during the execution of the captured screen. Date, which is date information, may include date information indicating the date during the execution of the captured screen. Time, which is time information, may include the time information indicating the time during the execution of the captured screen. Class Object, which is information about an internal class object, may include internal class object information that was used during the execution of the captured screen. It will be apparent to those of ordinary skill in the art that the class object may include any other information for executing the captured screen.

The application framework 310 may obtain execution path information for executing a state of a captured screen using the above information included in the class object.

In accordance with an embodiment of the present disclosure, the electronic device 100 may also obtain execution path information corresponding to a captured application screen through the application 320.

FIG. 6 is a flowchart illustrating an operation of obtaining execution path information through an application 320 according to an embodiment of the present disclosure.

Referring to FIG. 6, the application 320 may determine in operation 610 whether an application screen is captured.

If an application screen is captured during the execution of an application, the application 320 may obtain URI information corresponding to the captured screen in operation 620. The URI information may have a format of <ApplicationName>://<details> (ex. smartclip://1.png), and the like.

In operation 630, the application 320 may deliver the obtained URI information corresponding to the captured application screen to the application framework 310 in charge of the capture function.

Referring back to FIG. 2, the electronic device 100 may select an image of at least a part of the captured screen in operation 230.

FIGS. 7A to 7C illustrate an example of an operation of selecting at least a part of a captured screen according to an embodiment of the present disclosure.

Referring to FIGS. 7A to 7C, the electronic device 100 may select an entire image 710 of the captured application screen as in FIG. 7A. The electronic device 100 may select an image 720 corresponding to a specific object in the captured application screen as in FIG. 7B. The electronic device 100 may select an image 730 in a closed circle that is drawn on the captured application screen by the input unit 158 such as the electronic pen or the user's finger, as in FIG. 7C. In addition, ways to select at least a part of the captured screen may include many different ways such as a way to select an object depending on a drawing input (straight line, curved line and the like) for connecting objects existing on the screen, and a way to directly select a specific object existing on the screen.

In operation 240, the electronic device 100 may store the execution path information together with the image of at least a part of the captured screen.

For example, the electronic device 100 may store execution path information together with the entire image of the captured screen, or store execution path information together with an object in the captured screen, or store execution path information together with an image of the part that is selected by the user with a drawing input on the captured screen using the electronic pen, finger and the like.

The electronic device 100 may store the execution path information as a DataBase (DB) or a file, or may store the execution path information by including or inserting the execution path information in a metadata area in an image of at least a part of the captured screen.

The stored image (e.g., the entire image of the captured screen or the image of at least a part of the captured screen) may be displayed later on a captured image display screen at the user's request. The user may select the stored image from the captured image display screen.

If the stored image is selected in operation 250, the electronic device 100 may read the execution path information that is stored together with the selected image in operation 260.

For example, if the execution path information is stored as a DB or a file, the electronic device 100 may read the DB or the file. If the execution path information is stored in a metadata area in an image of at least a part of the captured screen, the electronic device 100 may read the execution path information from the metadata area.

In operation 270, the electronic device 100 may execute a state of the captured screen using the read execution path information.

For example, if the state of the captured screen was a state of displaying a contact detail view screen during the execution of a phonebook application, the electronic device 100 may display the contact detail view screen using the execution path information without a request for execution of the phonebook application for viewing the contact details.

If the state of the captured screen was a state of displaying a specific web page screen during the execution of a web browser application, the electronic device 100 may display the specific web page screen using the execution path information without an input of a request for executing a web browser and an input of an address for viewing the specific web page screen.

If the state of the captured screen was a state of displaying a specific music playback screen during the execution of a music playback application, the electronic device 100 may display a music playback screen at the time of the screen capture using the execution path information and play the music at the time of the screen capture, without a request for executing a music playback application and an input for requesting playback of specific music. In addition, in accordance with various embodiments of the present disclosure, the state of the captured screen may be a state during the execution of various applications, and the electronic device 100 may immediately execute the state of the captured screen using the execution path information, without an input for going to the state of the captured screen by executing the various applications.

In accordance with an embodiment of the present disclosure, the application 320 may be an application program that may be executed in the electronic device 100. The application 320 may be applications for performing various functions, such as, for example, a phonebook application, a web browser application, a music playback application, a clip application, a scrapbook application and the like.

In accordance with an embodiment of the present disclosure, the application framework 310 may execute at least one of the various applications, and display screens corresponding to the execution of the application on the touch screen 140. If an application execution screen is captured in response to a user input during the execution of an application, the application framework 310 may obtain execution path information corresponding to an image (hereinafter referred to as a 'captured image') of at least a part of the captured application execution screen, and store the captured image and the execution path information corresponding to the captured image. The captured image may be the entire image of the captured application screen, or a partial image that is cropped by the user's drawing input on the captured application screen.

Figure 8A:
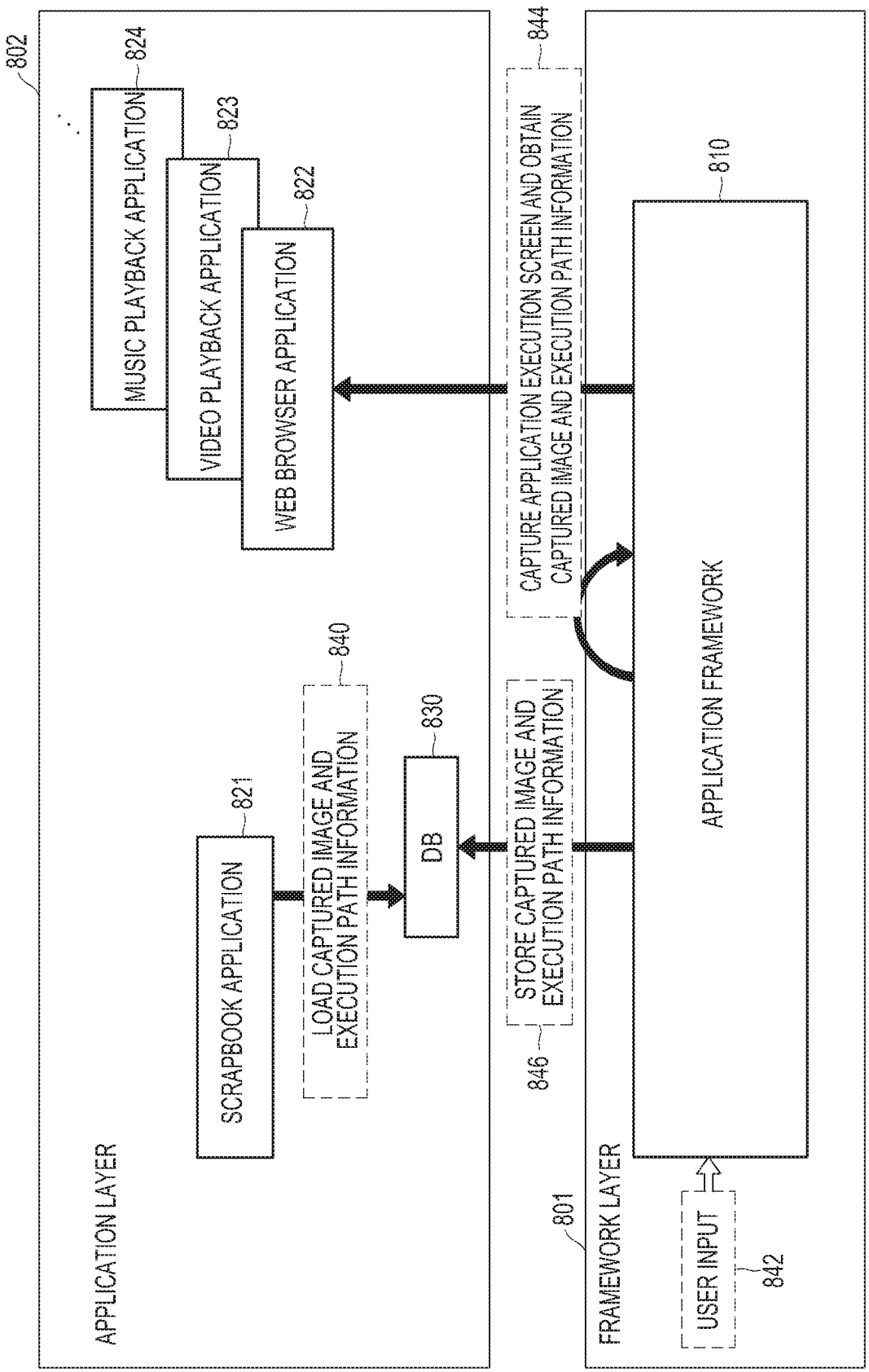
FIG. 8A illustrates the concept of capturing an application screen and obtaining execution path information corresponding to a captured image in an electronic device according to an embodiment of the present disclosure.

FIG. 8A illustrates the concept of capturing an application screen and obtaining execution path information corresponding to a captured image in an electronic device according to an embodiment of the present disclosure.

Referring to FIG. 8A, an application framework 810 may correspond to a framework layer 801, and various applications 821 to 824 may correspond to an application layer 802. In accordance with an embodiment of the present disclosure, the various applications 821 to 824 may include a scrapbook application 821, a web browser application 822, a video playback application 823, and a music playback application 824. The various applications 821 to 824 may further include other applications.

In accordance with an embodiment of the present disclosure, while an application execution screen is displayed, the application framework 810 may capture the application execution screen in response to a user input 842 (e.g., a screen capture request input from the user), and obtain a captured image and execution path information corresponding to the captured image, in operation 844.

In accordance with an embodiment of the present disclosure, the execution path information corresponding to the captured image may include metadata. The metadata may include a title corresponding to the application execution screen, a Uniform Resource Locator (URL) for restoring the application execution screen, a text corresponding to the application execution screen, a data file (e.g., a music file, a video file or an image file) corresponding to the application execution screen, drawing memo information corresponding to the application execution screen, handwriting recognition result information corresponding to the application execution screen, clip location information corresponding to the application execution screen, and the like.

In accordance with an embodiment of the present disclosure, the metadata may further include deep link information. The deep link information may be information for directly accessing resources used on the application execution screen. For example, the deep link information may be a direct link to the resources such as video, sound and image files related to the application execution screen. In addition, the deep link information may be information for accessing a sub page in a main page on the application execution screen.

In accordance with an embodiment of the present disclosure, the application framework 810 may store the captured image and the execution path information (e.g., metadata) corresponding to the captured image in a DB 830 (or a file system) in operation 846.

In accordance with an embodiment of the present disclosure, the DB 830 may be accessed by the scrapbook application 821. The scrapbook application 821 may access the DB 830 and load the captured image and the execution path information (e.g., metadata) corresponding to the captured image, which are stored in the DB 830, in operation 840, and may restore and execute the captured application execution screen depending on the loaded information.

Figure 8B:
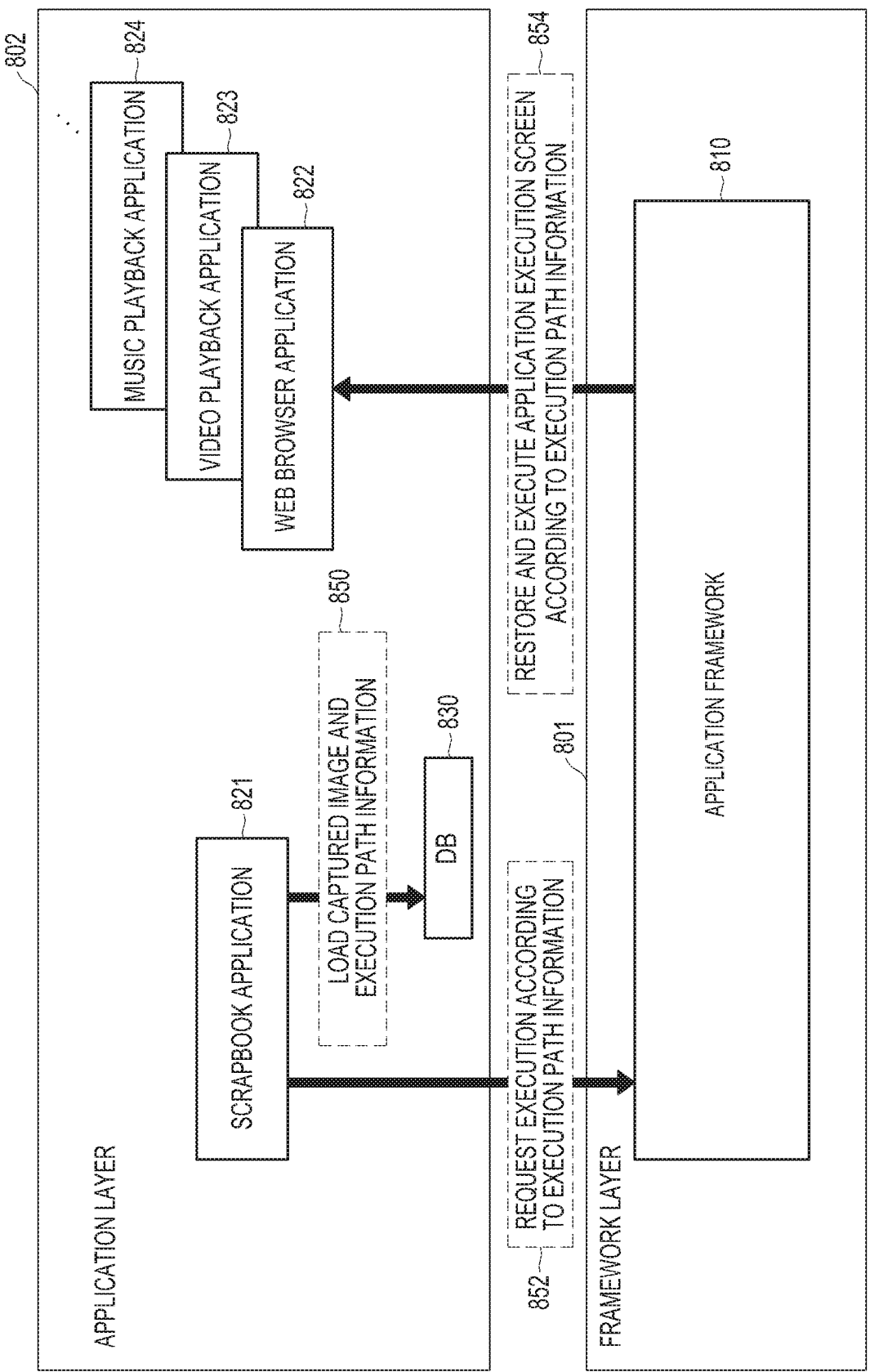
FIG. 8B illustrates the concept of operating using execution path information corresponding to a captured screen in an electronic device according to an embodiment of the present disclosure.

FIG. 8B illustrates the concept of restoring and executing a captured application execution screen in an electronic device according to an embodiment of the present disclosure.

Referring to FIG. 8B, the scrapbook application 821 may access the DB 830 and load the captured image and the execution path information (e.g., metadata) corresponding to the captured image, which are stored in the DB 830, in operation 850. The scrapbook application 821 may request execution depending on the execution path information in operation 852. In accordance with an embodiment of the present disclosure, the scrapbook application 821 may request execution depending on the execution path information (e.g., metadata).

The application framework 810 may restore and execute the application execution screen depending on the execution path information in operation 854. In accordance with an embodiment of the present disclosure, the application framework 810 may restore and execute the application execution screen depending on the metadata, for at least one or more applications.

FIGS. 9A to 9D illustrate an example of using a captured image during execution of a web browser application in an electronic device according to an embodiment of the present disclosure.

Referring to FIG. 9A, the electronic device 100 may capture a web page screen while displaying a web page screen 910 during the execution of a web browser application as in FIG. 9A.

Referring to FIG. 9B, the electronic device 100 may select an image of the entire or at least a part in a captured web page screen 920. In the example of FIG. 9B, the electronic device 100 may select an image 930 in a closed circle that is drawn by the user. An image in the desired form of a rectangle, a circle, a polygon and the like may be selected by the user on the web page screen. The electronic device 100 may store the selected image 930 and execution path information corresponding to the captured screen together.

Referring to FIG. 9C, the electronic device 100 may display a stored image 950 on a captured image display screen 940, allowing the user to select the stored image 950. The user may directly select the stored image 950, or may select a button 960 for requesting to execute a state of the stored image 950.

Referring to FIG. 9D, if the user selects the stored image 950 or the button 960 for requesting to execute a state of the stored image 950, the electronic device 100 may execute a state 970 of the captured screen corresponding to the stored image 950 as in FIG. 9D.

FIGS. 10A to 10D illustrate an example of using a captured image during execution of a music playback application in an electronic device according to an embodiment of the present disclosure.

Figures 10A, 10B, 10C, 10D:
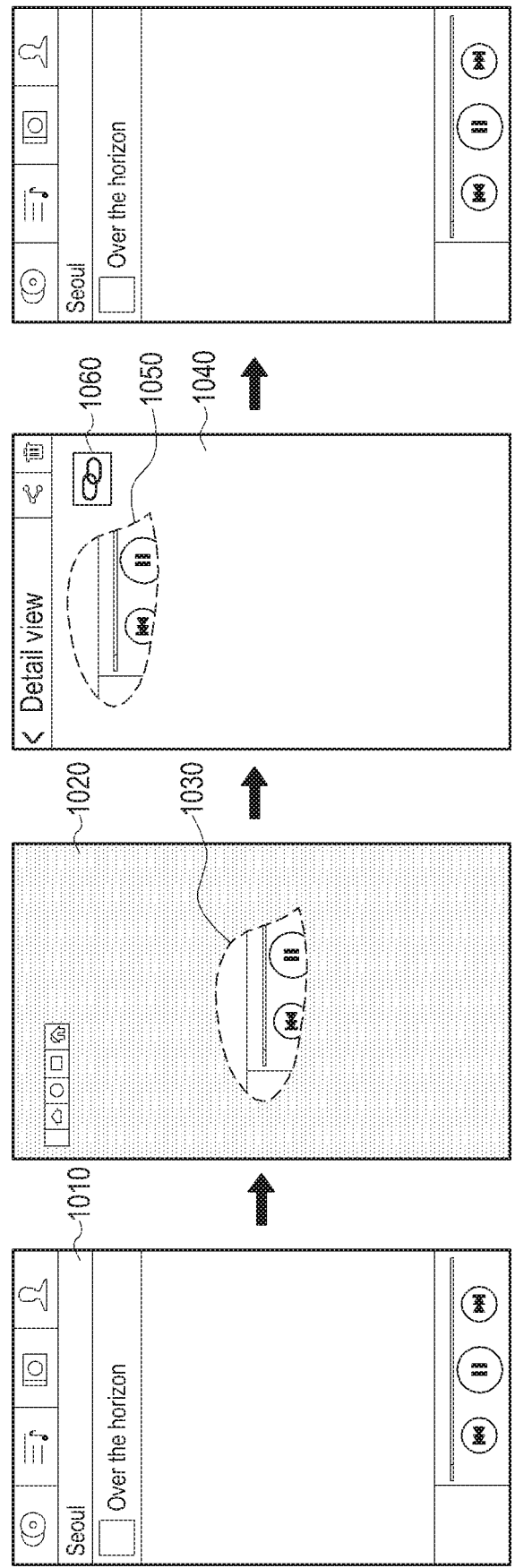
FIGS. 10A, 10B, 10C, and 10D illustrate an example of using a captured image during execution of a music playback application in an electronic device according to an embodiment of the present disclosure.

Referring to FIG. 10A, the electronic device 100 may capture a music playback screen while displaying a music playback screen 1010 during the execution of a music playback application as in FIG. 10A.

Referring to FIG. 10B, the electronic device 100 may select an image of the entire or at least a part in a captured music playback screen 1020. In the example of FIG. 10B, the electronic device 100 may select an image 1030 in a closed circle that is drawn by the user. An image in the desired form of a rectangle, a circle, a polygon and the like may be selected by the user in a desired position on the web page screen. The electronic device 100 may store the selected image 1030 and execution path information corresponding to the captured music playback screen together. For example, the selected image 1030 and the execution path information corresponding to the captured music playback screen may include URI information and music playback period information (or play time) at the time of the screen capture.

Referring to FIG. 10C, the electronic device 100 may display a stored image 1050 on a captured image display screen 1040, allowing the user to select the stored image 1050. The user may directly select the stored image 1050, or may select a button 1060 for requesting to execute a state of the stored image 1050.

Referring to FIG. 10D, if the user selects the stored image 1050 or the button 1060 for requesting to execute a state of the stored image 1050, the electronic device 100 may execute a state of the captured screen corresponding to the stored image 1050 as in FIG. 10D. For example, the electronic device 100 may play the music at a music playback point corresponding to the captured screen.

FIGS. 11A to 11E illustrate an example of using a captured image during execution of a clip application in an electronic device according to an embodiment of the present disclosure.

Figure 11A:
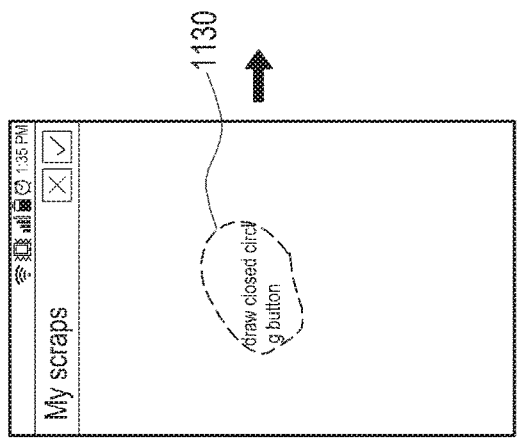
FIGS. 11A, 11B, 11C, 11D, and 11E illustrate an example of using a captured image during execution of a clip application in an electronic device according to an embodiment of the present disclosure.

Referring to FIG. 11A, the electronic device 100 may capture a clip screen while displaying a clip screen 1110, on which clipped texts are displayed, during the execution of a clip application as in FIG. 11A.

Figure 11B:
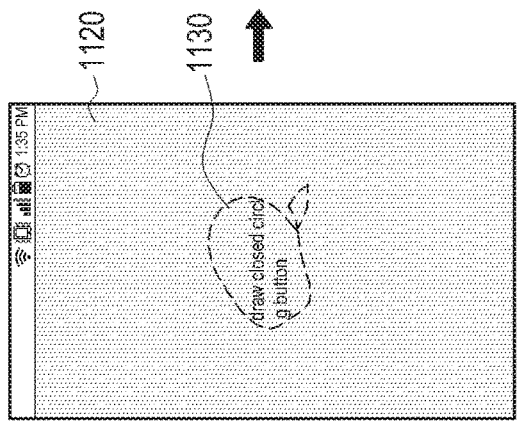

Referring to FIG. 11B, the electronic device 100 may select an image of the entire or at least a part in a captured clip screen 1120. In accordance with an embodiment of the present disclosure, the electronic device 100 may crop an image of the entire or at least a part by the user's drawing input on the captured clip screen 1120, and select the cropped image. In the example of FIG. 11B, the electronic device 100 may select an image 1130 in a closed circle that is drawn by the user. An image in the desired form of a rectangle, a circle, a polygon and the like may be selected by the user in a desired position on the captured clip screen.

Figure 11C:
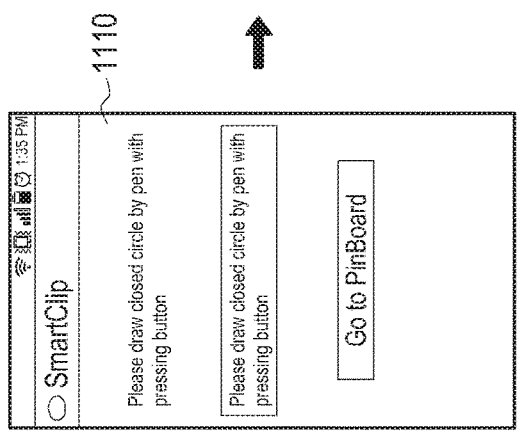

Referring to FIG. 11C, the electronic device 100 may store the selected image 1130 and execution path information corresponding to the captured clip screen together. The execution path information corresponding to the captured clip screen may include URI information such as 'slookdemos://SmartClip'.

Figure 11E:
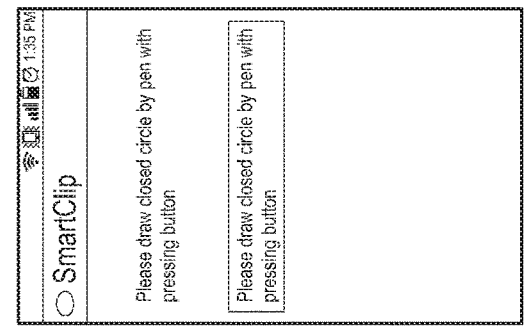
Figure 11D:
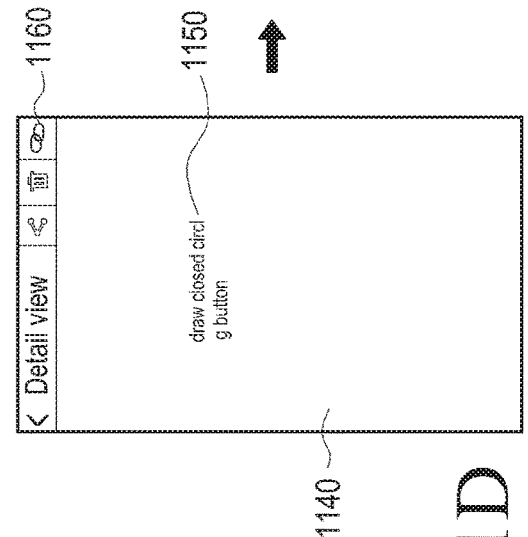

Referring to FIG. 11D, the electronic device 100 may display a stored image 1150 on a captured image display screen 1140, allowing the user to select the stored image 1150. The user may directly select the stored image 1150, or may select an icon 1160 for requesting to execute a state of the stored image 1150.

Referring to FIG. 11E, if the user selects the stored image 1150 or the icon 1160 for requesting to execute a state of the stored image 1150, the electronic device 100 may execute a state of the captured original screen corresponding to the stored image 1150 as in FIG. 10E. For example, the electronic device 100 may display a clip screen corresponding to the captured screen.

In accordance with the above-described various embodiments of the present disclosure, if the user captures a screen while viewing the screen associated with the execution of an application, the electronic device may store an image of at least a part of the captured screen and execution path information for executing a state of the captured screen, allowing the user to execute a state of the captured screen using the captured screen.

For example, if the user selects an image of at least a part of the stored web page screen, a state of the web page screen may be executed. Therefore, the user may omit the user input operation of executing a web browser to execute a state of the web page screen and entering a web page address on the web browser.

If the user selects an image of at least a part of the stored multimedia content playback screen, a state of the multimedia content playback screen may be executed. Therefore, the user may omit the user input operation of executing a multimedia content playback application to execute a state of the multimedia content playback screen and selecting multimedia content to be executed by the multimedia content playback application. Specifically, the multimedia content may include not only the music and video, but also a variety of content that may be played in the electronic device. In the case where the multimedia content is music, if the user selects an image of at least a part of a multimedia playback screen, such as the stored music and video, a state of the music playback screen may be executed. Therefore, the user may omit the user input operation of executing a music playback application to execute a state of the music playback screen and selecting music to be played in the music playback application.

In addition, if the user selects an image of at least a part of the stored clip screen, a state of the clip screen may be executed. Therefore, the user may omit the user input operation of executing a clip application to display a clip screen and selecting a clip screen to be displayed in the clip application.

It will be apparent to those of ordinary skill in the art that the execution based on the captured screen may be applied to various applications even in other embodiments of the present disclosure.

In accordance with various embodiments of the present disclosure, the electronic device 100 may share an image captured from an application execution screen, and execution path information corresponding to the captured image.

Figure 12:
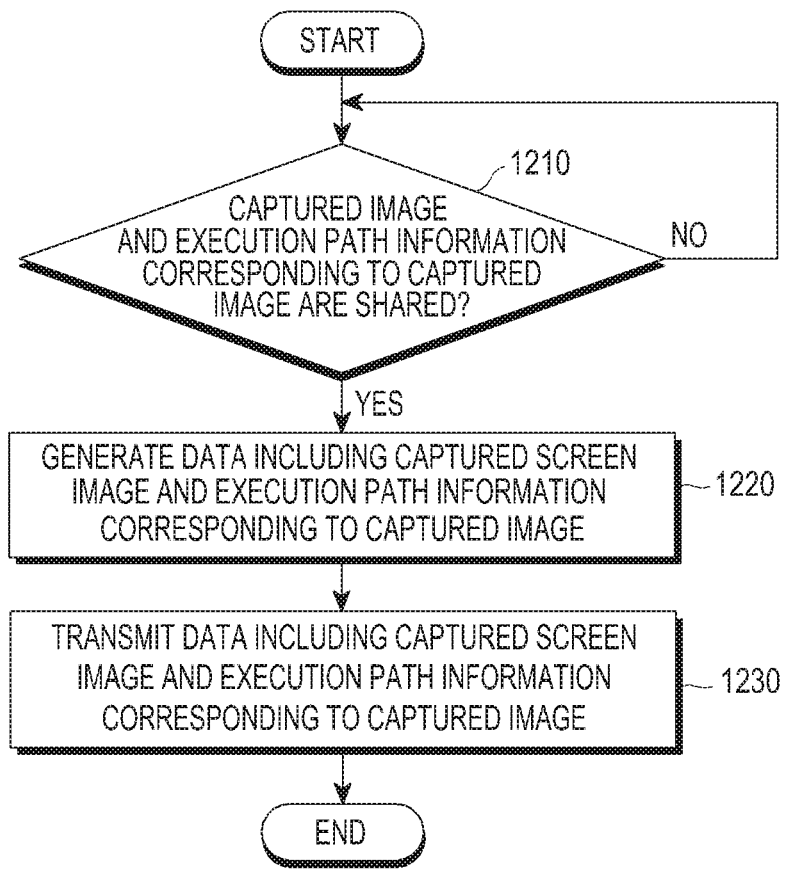
FIG. 12 is a flowchart illustrating an operation of sharing a captured image in an electronic device according to an embodiment of the present disclosure.

FIG. 12 is a flowchart illustrating an operation of sharing an image captured from an application execution screen, and execution path information corresponding to the captured image according to an embodiment of the present disclosure.

Referring to FIG. 12, the electronic device 100 may determine in operation 1210 whether a request for sharing an image captured from an application screen and execution path information is received from the user.

Upon receiving a request for sharing a captured image and execution path information corresponding to the captured image, the electronic device 100 may generate data including the captured image and the execution path information corresponding to the captured image in operation 1220. In accordance with an embodiment of the present disclosure, the data including the captured image and the execution path information corresponding to the captured image may have a scrapbook file (SCC) data format, or a data format comprised of images and texts. In addition, the data including the captured image and the execution path information corresponding to the captured image may have any sharable data format.

In operation 1230, the electronic device 100 may transmit the data including the captured image and the execution path information corresponding to the captured image, in order to share the data.

In accordance with various embodiments of the present disclosure, the electronic device 100 may share the data including the captured image and the execution path information corresponding to the captured image, with another electronic device of the same user or an electronic device of another user, through a data sharing server. Accordingly, the electronic device 100 may allow the user to execute the operation that was performed during the capture, using the captured image even in another electronic device of the same user or an electronic device of another user.

In accordance with an embodiment of the present disclosure, the data sharing server may include a storage unit for storing the data including the captured image and the execution path information corresponding to the captured image, the data being uploaded from a first electronic device, and a controller for downloading, if the data is uploaded, the stored data to a second electronic device that may access the data sharing server with the same account as that of the first electronic device.

Figure 13:
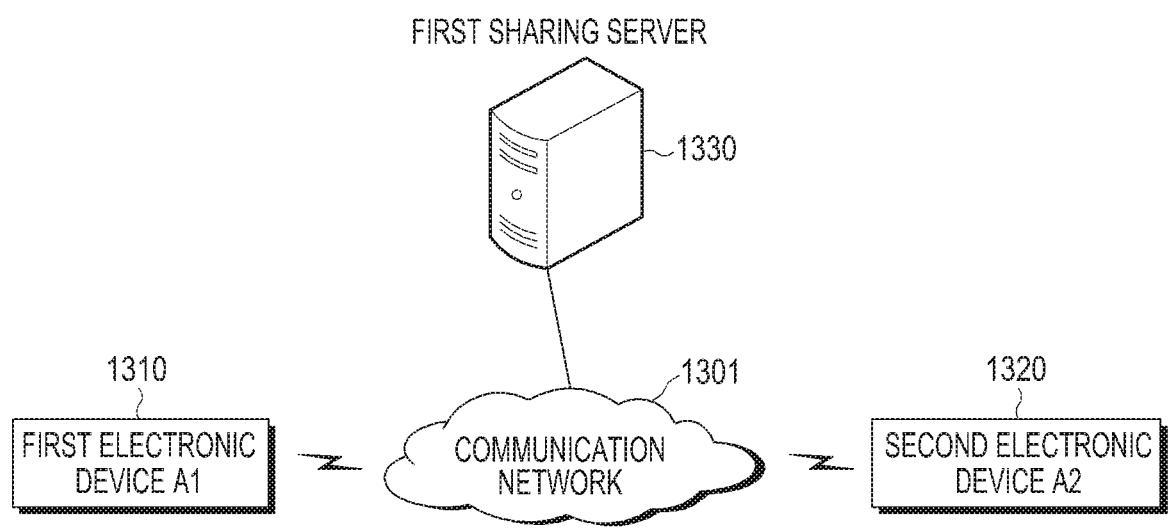
FIG. 13 illustrates a system for sharing a captured image and execution path information corresponding to the captured image according to a first embodiment of the present disclosure.

FIG. 13 illustrates a system for sharing a captured image and execution path information corresponding to the captured image according to a first embodiment of the present disclosure.

Referring to FIG. 13, a first electronic device A1 1310 may share an image captured from an application execution screen and execution path information corresponding to the captured image by synchronizing them with a second electronic device A2 1320 through a first sharing server 1330. The first sharing server 1330 may be a server for providing synchronization between electronic devices having the same account, such as, for example, an i-cloud server and the like. The second electronic device A2 1320 may be another electronic device of the same user as the user of the first electronic device A1 1310, and may access the first sharing server 1330 across a communication network 1301 using the same account as that of the first electronic device A1 1310.

Figure 14:
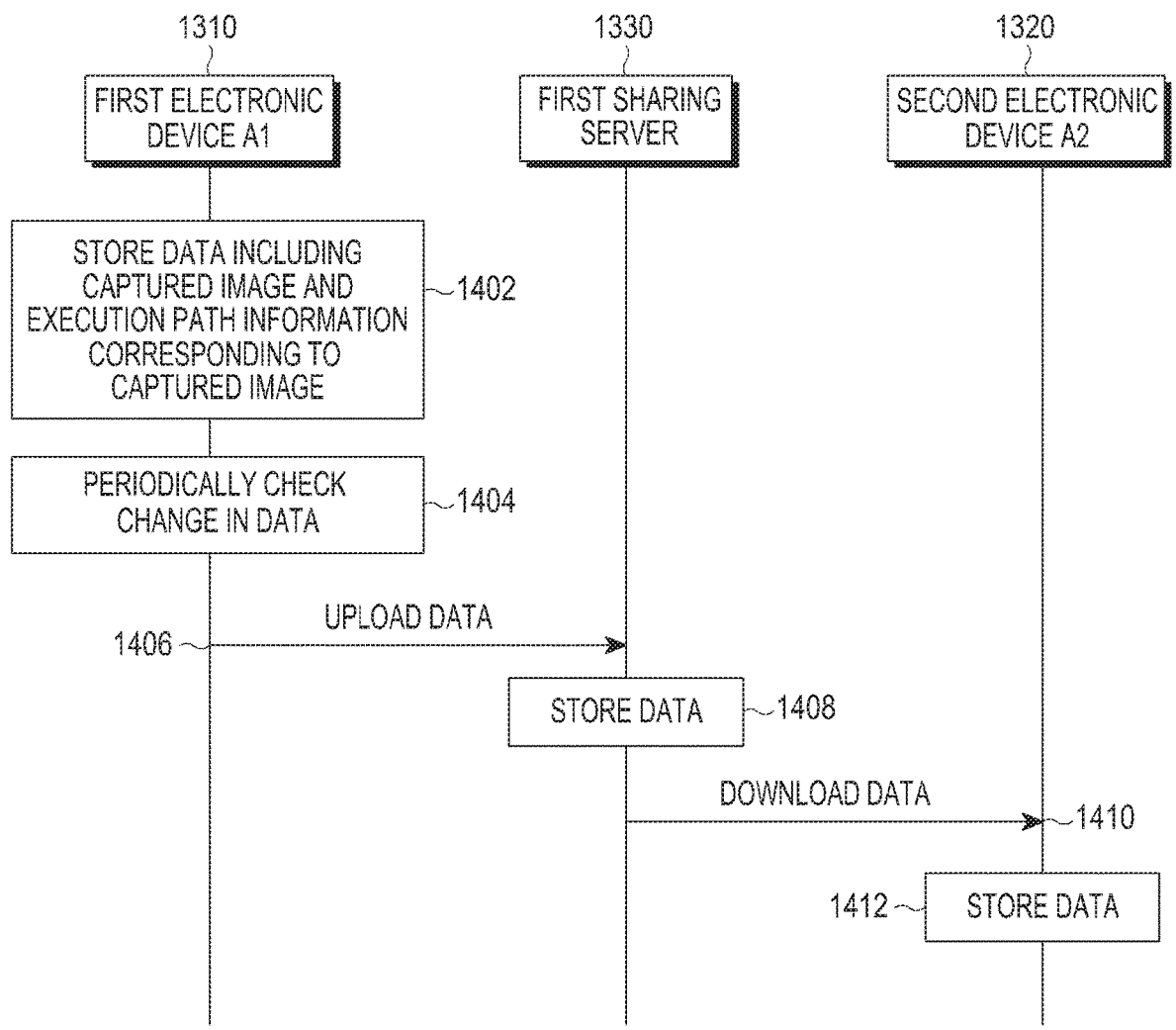
FIG. 14 illustrates an operation of a system for sharing a captured image and execution path information corresponding to the captured image according to the first embodiment of the present disclosure.

FIG. 14 illustrates an operation of a system for sharing a captured image and execution path information corresponding to the captured image according to a first embodiment of the present disclosure.

Referring to FIG. 14, in operation 1402, the first electronic device A1 1310 may store an image captured from an application execution screen and execution path information corresponding to the captured image, as data in a predetermined format.

In accordance with an embodiment of the present disclosure, the data in a predetermined format may be data in an SCC format, or data in a format comprised of images and texts. In addition, the data including the captured image and the execution path information corresponding to the captured image may have any sharable data format.

In accordance with an embodiment of the present disclosure, the execution path information corresponding to the captured image may include information for executing a state of the captured image. The execution path information corresponding to the captured image may include metadata. The metadata may include a title corresponding to the application execution screen, a URL for restoring the application execution screen, a text corresponding to the application execution screen, a data file (e.g., a music file, a video file or an image file) corresponding to the application execution screen, drawing memo information corresponding to the application execution screen, handwriting recognition result information corresponding to the application execution screen, clip location information corresponding to the application execution screen, and the like.

In accordance with an embodiment of the present disclosure, the metadata may further include deep link information. The deep link information may be information for directly accessing resources used on the application execution screen. For example, the deep link information may be a direct link to the resources such as video, sound and image files related to the application execution screen. In addition, the deep link information may be information for accessing a sub page in a main page on the application execution screen.

In operation 1404, the first electronic device A1 1310 may periodically check a change in data. Upon detecting a change in data, the first electronic device A1 1310 may upload the data to the first sharing server 1330 over a communication network 1301, in operation 1406.

In operation 1408, the first sharing server 1330 may store the data uploaded from the first electronic device A1 1310.

After storing the uploaded data, the first sharing server 1330 may download the data to the second electronic device A2 1320 that is set to be synchronized with the first electronic device A1 1310, in operation 1410.

In accordance with an embodiment of the present disclosure, the first sharing server 1330 may download the data to the second electronic device A2 1320 using a push message scheme or a polling scheme.

In the case of the push message scheme, the first sharing server 1330 may notify the second electronic device A2 1320 that the data is stored in the first sharing server 1330, using a push message, and the second electronic device A2 1320 may request the stored data from the first sharing server 1330 in response to the push message. The first sharing server 1330 may download the data to the second electronic device A2 1320 in response to the request for the stored data.

In the case of the polling scheme, the second electronic device A2 1320 may periodically make a request for querying whether there is newly stored data in the first sharing server 1330, and in response to the query request from the second electronic device A2 1320, if there is newly stored data, the first sharing server 1330 may send a response message indicating the presence of the newly stored data, and then download the newly stored data to the second electronic device A2 1320.

In operation 1412, the second electronic device A2 1320 may be synchronized with the first electronic device A1 1310 by storing the downloaded data, making it possible to share the data. In accordance with an embodiment of the present disclosure, the first electronic device A1 1310 may capture the entire web page screen from the web browser application execution screen (e.g., the web page screen) in response to a user input, or may obtain an image of at least a part of the captured web page screen by cropping a partial image from the captured web page screen. The first electronic device A1 1310 may share the image of at least a part of the captured web page screen and execution path information corresponding to the image of at least a part of the captured web page screen, with the second electronic device A2 1320 through the first sharing server 1330.

For example, during display of the web page screen, the first electronic device A1 1310 may obtain an image of at least a part of the web page in response to a user input. In accordance with an embodiment of the present disclosure, the first electronic device A1 1310 may obtain an image of a captured web page screen by capturing a web page screen using an application (e.g., a SmartClip application) for performing a capture function in response to a user input, or may obtain an image of at least a part of the web page by cropping a partial image from the captured web page screen. In the following description, the image of the captured web page screen or the partial image cropped from the captured web page screen may be referred to as a captured image.

The first electronic device A1 1310 may obtain execution path information corresponding to the captured image. The execution path information corresponding to the captured image may include information for executing a state of the captured image. In accordance with an embodiment of the present disclosure, the execution path information corresponding to the captured image may include metadata. The metadata may include a title corresponding to the web page, a URL for restoring the web page, a text corresponding to the web page, a data file (e.g., a music file, a video file or an image file) corresponding to the web page, drawing memo information corresponding to the web page, handwriting recognition result information corresponding to the web page, clip location information corresponding to the web page, and the like. In accordance with an embodiment of the present disclosure, the metadata may further include deep link information. The deep link information may be information for directly accessing resources used in the web page. For example, the deep link information may be a direct link to the resources such as video, sound and image files related to the web page. In addition, the deep link information may be information for accessing a sub page in a main page on the web page.

The first electronic device A1 1310 may store the captured web page image and the execution path information corresponding to the captured web page image, as data in a predetermined format. In accordance with an embodiment of the present disclosure, the data in a predetermined format may be data in an SCC format, or data in a format comprised of images and texts. In addition, the data including the captured image and the execution path information corresponding to the captured image may have any sharable data format.

The first electronic device A1 1310 may periodically check a change in data of the DB related to a scrapbook application. Upon detecting a change in data, the first electronic device A1 1310 may upload the data including the captured web page image and the execution path information corresponding to the captured web page image to the first sharing server 1330 over the communication network 1301. The first sharing server 1330 may store the data uploaded from the first electronic device A1 1310.

After storing the uploaded data, the first sharing server 1330 may download the data including the captured web page image and the execution path information corresponding to the captured web page image to the second electronic device A2 1320 that is set to be synchronized with the first electronic device A1 1310.

In accordance with an embodiment of the present disclosure, the first sharing server 1330 may download the data including the captured web page image and the execution path information corresponding to the captured web page image to the second electronic device A2 1320 using the push message scheme or the polling scheme.

In the case of the push message scheme, the first sharing server 1330 may notify the second electronic device A2 1320 that the data including the captured web page image and the execution path information corresponding to the captured web page image is stored in the first sharing server 1330, using a push message, and the second electronic device A2 1320 may request the data including the captured web page image and the execution path information corresponding to the captured web page image, from the first sharing server 1330 in response to the push message. The first sharing server 1330 may download the data including the captured web page image and the execution path information corresponding to the captured web page image to the second electronic device A2 1320 in response to the request for the stored data.

In the case of the polling scheme, the second electronic device A2 1320 may periodically make a request for querying whether there is newly stored data in the first sharing server 1330, and in response to the query request from the second electronic device A2 1320, if there is newly stored data, the first sharing server 1330 may send a response message indicating the presence of the newly stored data, and then download the newly stored data including the captured web page image and the execution path information corresponding to the captured web page image to the second electronic device A2 1320.

The second electronic device A2 1320 may be synchronized with the first electronic device A1 1310 by storing the downloaded data including the captured web page image and the execution path information corresponding to the captured web page image, making it possible to share the captured web page image and the execution path information corresponding to the captured web page image. The second electronic device A2 1320 may display the captured web page image and the execution path information corresponding to the captured web page image, for the user, making it possible to display the web page screen using the execution path information corresponding to the captured web page image.

In accordance with an embodiment of the present disclosure, the first electronic device A1 1310 may capture a video playback service application execution screen from a video playback service application execution screen (e.g., YouTube™ screen) in response to a user input, or obtain an image of at least a part of the captured video playback service application execution screen by cropping a partial image from the captured video playback service application execution screen. The first electronic device A1 1310 may share the image of at least a part of the captured video playback service application execution screen and execution path information corresponding to the image of at least a part of the captured video playback service application execution screen, with the second electronic device A2 1320 through the first sharing server 1330.

In accordance with an embodiment of the present disclosure, the first electronic device A1 1310 may obtain a captured video playback service screen image by capturing a video playback service screen using an application (e.g., a SmartClip application) for performing a capture function during display of a video playback service application execution screen, or may obtain an image of at least a part of the captured video playback service screen image by cropping a partial image from the captured video playback service screen image. Herein, the captured video playback service screen image or the partial image cropped from the captured video playback service screen may be referred to as a captured image.

The first electronic device A1 1310 may obtain execution path information corresponding to the captured image. The execution path information corresponding to the captured image may include information for executing a state of the captured image. In accordance with an embodiment of the present disclosure, the execution path information corresponding to the captured image may include metadata. The metadata may include a title corresponding to the video playback service, a URL for restoring the video playback service, a text corresponding to the video playback service, a data file (e.g., a music file, a video file or an image file) corresponding to the video playback service, drawing memo information corresponding to the video playback service, handwriting recognition result information corresponding to the video playback service, clip location information corresponding to the video playback service, and the like. In accordance with an embodiment of the present disclosure, the metadata may further include deep link information. The deep link information may be information for directly accessing resources used in the video playback service screen. For example, the deep link information may be a direct link to the resources such as video, sound and image files related to the video playback service screen. In addition, the deep link information may be information for accessing a sub page in a main page on the video playback service screen.

The first electronic device A1 1310 may store an image of at least a part of the captured video playback service screen and execution path information corresponding to the image of at least a part of the captured video playback service screen, as data in a predetermined format. In accordance with an embodiment of the present disclosure, the data in a predetermined format may be data in an SCC format, or data in a format comprised of images and texts. In addition, the data including the captured image and the execution path information corresponding to the captured image may have any sharable data format. In accordance with an embodiment of the present disclosure, the data in a predetermined format may be stored in a DB related to a scrapbook application.

The first electronic device A1 1310 may periodically check a change in data of the DB related to a scrapbook application. Upon detecting a change in data, the first electronic device A1 1310 may upload the data including the image of at least a part of the captured video playback service screen and execution path information corresponding to the image of at least a part of the captured video playback service screen, to the first sharing server 1330 over the communication network 1301. The first sharing server 1330 may store the data uploaded from the first electronic device A1 1310. After storing the uploaded data, the first sharing server 1330 may download the data including the image of at least a part of the captured video playback service screen and the execution path information corresponding to the image of at least a part of the captured video playback service screen, to the second electronic device A2 1320 that is set to be synchronized with the first electronic device A1 1310.

In accordance with an embodiment of the present disclosure, the first sharing server 1330 may download the data including the image of at least a part of the captured video playback service screen and the execution path information corresponding to the image of at least a part of the captured video playback service screen, to the second electronic device A2 1320 using the push message scheme or the polling scheme.

In the case of the push message scheme, the first sharing server 1330 may notify the second electronic device A2 1320 that the data is stored in the first sharing server 1330, using a push message, and the second electronic device A2 1320 may request the stored data from the first sharing server 1330 in response to the push message. The first sharing server 1330 may download the data including the image of at least a part of the captured video playback service screen and the execution path information corresponding to the image of at least a part of the captured video playback service screen, to the second electronic device A2 1320 in response to the request for the stored data.

In the case of the polling scheme, the second electronic device A2 1320 may periodically make a request for querying whether there is newly stored data in the first sharing server 1330, and in response to the query request from the second electronic device A2 1320, if there is newly stored data, the first sharing server 1330 may send a response message indicating the presence of the newly stored data, and then download the newly stored data including the image of at least a part of the captured video playback service screen and the execution path information corresponding to the image of at least a part of the captured video playback service screen, to the second electronic device A2 1320.

The second electronic device A2 1320 may be synchronized with the first electronic device A1 1310 by storing the downloaded data including the image of at least a part of the captured video playback service screen and the execution path information corresponding to the image of at least a part of the captured video playback service screen, making it possible to share the image of at least a part of the captured video playback service screen and the execution path information corresponding to the image of at least a part of the captured video playback service screen. The second electronic device A2 1320 may display the image of at least a part of the captured video playback service screen and the execution path information corresponding to the image of at least a part of the captured video playback service screen, for the user, making it possible to execute the video playback service using the execution path information corresponding to the image of at least a part of the captured video playback service screen.

In accordance with an embodiment of the present disclosure, the first electronic device A1 1310 may obtain an image of at least a part of the captured music playback screen by capturing a music playback screen from a music playback application execution screen (e.g., a music playback screen) in response to a user input. The first electronic device A1 1310 may obtain the entire image of the captured music playback screen, or obtain a partial image of the captured music playback screen by cropping a partial image from the captured music playback screen. The first electronic device A1 1310 may share the image of at least a part of the captured music playback screen and the execution path information corresponding to the image of at least a part of the captured music playback screen, with the second electronic device A2 1320 through the first sharing server 1330.

In accordance with an embodiment of the present disclosure, the first electronic device A1 1310 may capture an image of at least a part of the music playback screen using an application (e.g., a SmartClip application) for performing a capture function in response to a user input during playback of music. In the following description, the entire image of the captured music playback screen or a partial image cropped from the captured music playback screen may be referred to as a captured image.

The first electronic device A1 1310 may obtain execution path information corresponding to the captured image. The execution path information corresponding to the captured image may include information for executing a music playback state of the captured image. In accordance with an embodiment of the present disclosure, the execution path information corresponding to the captured image may include metadata. The metadata may include a title corresponding to the music playback screen, a URL for restoring a state of the music playback screen, a text corresponding to the music playback screen, a data file (e.g., a music file, a video file or an image file) corresponding to the music playback screen, drawing memo information corresponding to the music playback screen, handwriting recognition result information corresponding to the music playback screen, clip location information corresponding to the music playback screen, and the like. In accordance with an embodiment of the present disclosure, the metadata may further include deep link information. The deep link information may be information for directly accessing resources used in the music playback screen. For example, the deep link information may be a direct link to an audio file related to the music playback screen. In addition, the deep link information may be information for accessing a sub page in a main page on the music playback screen.

The first electronic device A1 1310 may store an image of at least a part of the captured music playback screen and execution path information corresponding to the image of at least a part of the captured music playback screen, as data in a predetermined format. In accordance with an embodiment of the present disclosure, the data in a predetermined format may be data in an SCC format, or data in a format comprised of images and texts. In addition, the data including the captured image and the execution path information corresponding to the captured image may have any sharable data format. In accordance with an embodiment of the present disclosure, the first electronic device A1 1310 may further include or insert, into the data, an audio file corresponding to the music playback screen.

The first electronic device A1 1310 may periodically check a change in data of the DB related to a scrapbook application. Upon detecting a change in data, the first electronic device A1 1310 may upload the image of at least a part of the captured music playback screen and the execution path information corresponding to the image of at least a part of the captured music playback screen, to the first sharing server 1330 over the communication network 1301. In accordance with an embodiment of the present disclosure, the first electronic device A1 1310 may upload the data that further includes the audio file in addition to the image of at least a part of the captured music playback screen and the execution path information corresponding to the image of at least a part of the captured music playback screen, to the first sharing server 1330 over the communication network 1301. In accordance with an embodiment of the present disclosure, the audio file may be uploaded only when the audio file's data size is less than or equal to a predetermined data size. The predetermined data size may be, for example, 15 Mbytes.

The first sharing server 1330 may store the data uploaded from the first electronic device A1 1310. After storing the uploaded data, the first sharing server 1330 may download the data including the image of at least a part of the captured music playback screen and the execution path information corresponding to the image of at least a part of the captured music playback screen or the data including the image of at least a part of the captured music playback screen, the execution path information corresponding to the image of at least a part of the captured music playback screen and the audio file, to the second electronic device A2 1320 that is set to be synchronized with the first electronic device A1 1310.

In accordance with an embodiment of the present disclosure, the first sharing server 1330 may download the data including the image of at least a part of the captured music playback screen and the execution path information corresponding to the image of at least a part of the captured music playback screen or the data including the image of at least a part of the captured music playback screen, the execution path information corresponding to the image of at least a part of the captured music playback screen and the audio file, to the second electronic device A2 1320 using the push message scheme or the polling scheme.

In the case of the push message scheme, the first sharing server 1330 may notify the second electronic device A2 1320 that the data is stored in the first sharing server 1330, using a push message, and the second electronic device A2 1320 may request the stored data from the first sharing server 1330 in response to the push message. The first sharing server 1330 may download the data including the image of at least a part of the captured music playback screen and the execution path information corresponding to the image of at least a part of the captured music playback screen or the data including the image of at least a part of the captured music playback screen, the execution path information corresponding to the image of at least a part of the captured music playback screen and the audio file, to the second electronic device A2 1320 in response to the request for the stored data.

In the case of the polling scheme, the second electronic device A2 1320 may periodically make a request for querying whether there is newly stored data in the first sharing server 1330, and in response to the query request from the second electronic device A2 1320, if there is newly stored data, the first sharing server 1330 may send a response message indicating the presence of the newly stored data, and then download the newly stored data including the image of at least a part of the captured music playback screen and the execution path information corresponding to the image of at least a part of the captured music playback screen or the newly stored data including the image of at least a part of the captured music playback screen, the execution path information corresponding to the image of at least a part of the captured music playback screen and the audio file, to the second electronic device A2 1320.

The second electronic device A2 1320 may download the data including the image of at least a part of the captured music playback screen and the execution path information corresponding to the image of at least a part of the captured music playback screen, or the data including the image of at least a part of the captured music playback screen, the execution path information corresponding to the image of at least a part of the captured music playback screen and the audio file, from the first sharing server 1330. The second electronic device A2 1320 may be synchronized with the first electronic device A1 1310 by storing the downloaded data including the image of at least a part of the captured music playback screen and the execution path information corresponding to the image of at least a part of the captured music playback screen, or the downloaded data including the image of at least a part of the captured music playback screen, the execution path information corresponding to the image of at least a part of the captured music playback screen and the audio file, making it possible to share the image of at least a part of the captured music playback screen and the execution path information corresponding to the image of at least a part of the captured music playback screen, or to share the image of at least a part of the captured music playback screen, the execution path information corresponding to the image of at least a part of the captured music playback screen, and the audio file. The second electronic device A2 1320 may display the image of at least a part of the captured music playback screen and the execution path information corresponding to the image of at least a part of the captured music playback screen, for the user, making it possible to play the music using the execution path information corresponding to the image of at least a part of the captured music playback screen. Alternatively, the second electronic device A2 1320 may play the audio file.

In accordance with an embodiment of the present disclosure, the data sharing server may include a storage unit for storing the data including the captured image and the execution path information corresponding to the captured image, the data being uploaded from a first electronic device, and a controller for transmitting, if the data is uploaded, a URL of the uploaded data to the first electronic device, allowing the first electronic device to forward the URL of the uploaded data to a second electronic device, and for downloading the uploaded data to the second electronic device in response to a data request that the second electronic device has made using the URL of the uploaded data.

Figure 15:
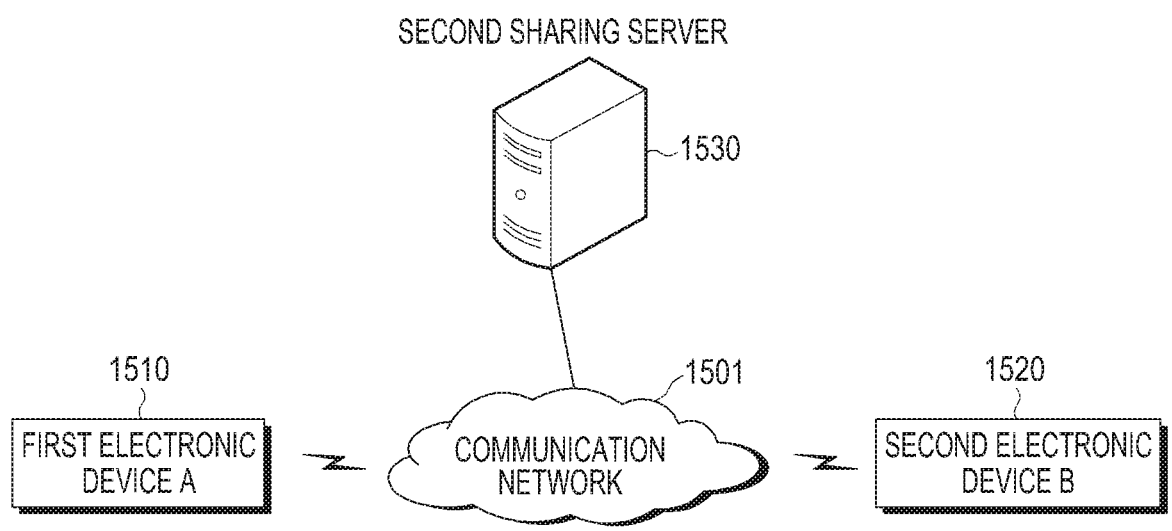
FIG. 15 illustrates a system for sharing a captured image and execution path information corresponding to the captured image according to a second embodiment of the present disclosure.

FIG. 15 illustrates a system for sharing a captured image and execution path information corresponding to the captured image according to a second embodiment of the present disclosure.

Referring to FIG. 15, a first electronic device A 1510 may upload data including a captured image and execution path information corresponding to the captured image to a second sharing server 1530 over a communication network 1501. The first electronic device A 1510 may receive a URL of the uploaded data from the second sharing server 1530, and provide the URL to a second electronic device B 1520.

The second sharing server 1530 may be, for example, a server that provides a cloud storage service, such as Dropbox™ and the like, and may also be a server that provides a service in which electronic devices may upload and download data. If data is uploaded from the first electronic device A 1510, the second sharing server 1530 may provide a URL of the uploaded data to the first electronic device A 1510.

The second electronic device B 1520 may receive the URL of the data uploaded to the second sharing server 1530, from the first electronic device A 1510 over the communication network 1501. The second electronic device B 1520 may be an electronic device of a user different from the user of the first electronic device A 1510, and may download data corresponding to the URL of the uploaded data by accessing the second sharing server 1530 using a different account from that of the first electronic device A 1510. The second electronic device B 1520 may share the data with the first electronic device A 1510 by storing the downloaded data.

Figure 16:
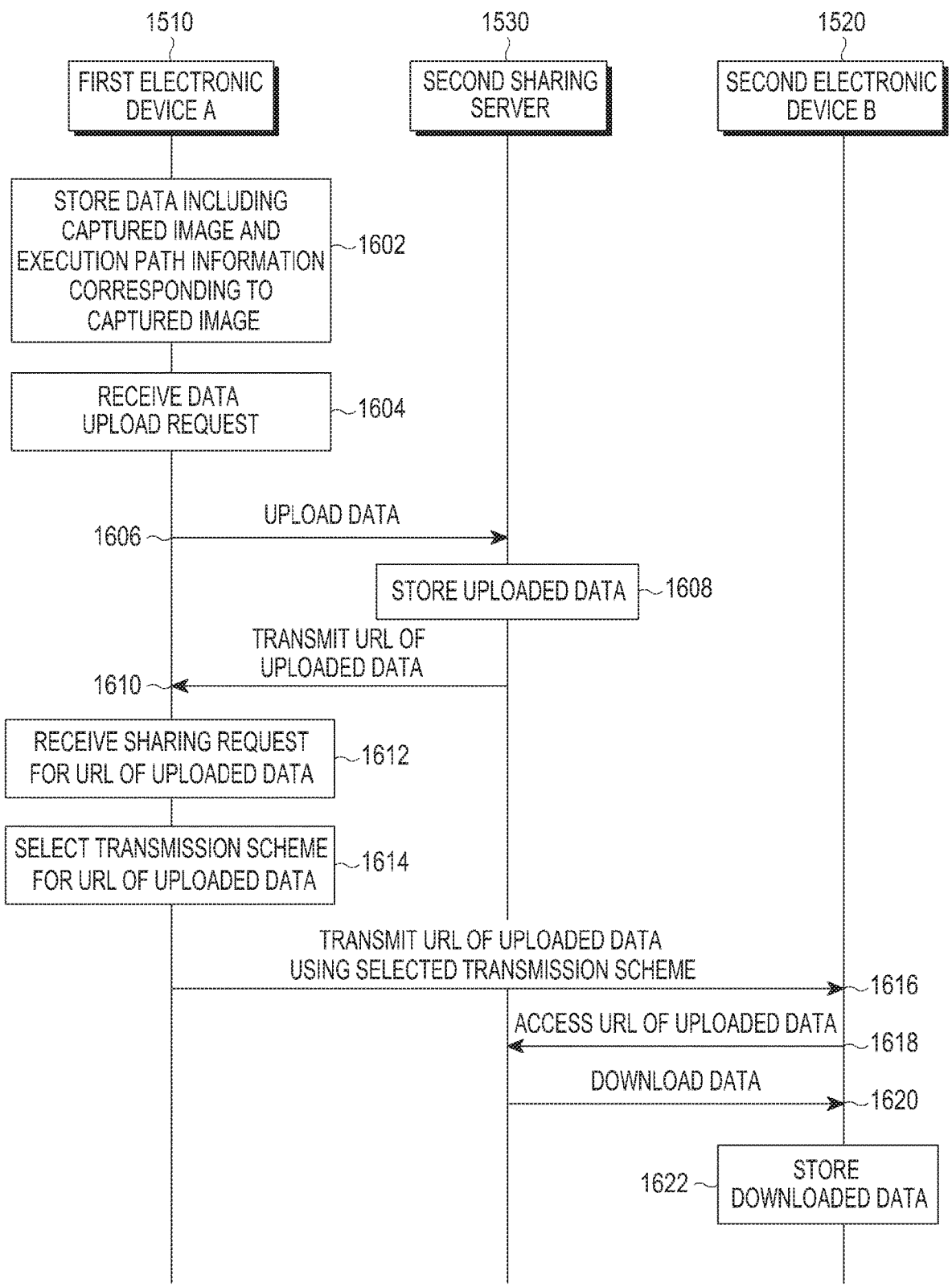
FIG. 16 illustrates an operation of a system for sharing a captured image and execution path information corresponding to the captured image according to the second embodiment of the present disclosure.

FIG. 16 illustrates an operation of a system for sharing a captured image and execution path information corresponding to the captured image according to a second embodiment of the present disclosure.

Referring to FIG. 16, in operation 1602, the first electronic device A 1510 may store an image captured from an application execution screen and execution path information corresponding to the captured image. In accordance with an embodiment of the present disclosure, the first electronic device A 1510 may store the captured image and the execution path information corresponding to the captured image, as data in a predetermined format. In accordance with an embodiment of the present disclosure, the data in a predetermined format may be data in an SCC format, or data in a format comprised of images and texts. In addition, the data including the captured image and the execution path information corresponding to the captured image may have any sharable data format.

In accordance with an embodiment of the present disclosure, the execution path information corresponding to the captured image may include metadata. The metadata may include a title corresponding to the application execution screen, a URL for restoring the application execution screen, a text corresponding to the application execution screen, a data file (e.g., a music file, a video file or an image file) corresponding to the application execution screen, drawing memo information corresponding to the application execution screen, handwriting recognition result information corresponding to the application execution screen, clip location information corresponding to the application execution screen, and the like.

In accordance with an embodiment of the present disclosure, the metadata may further include deep link information. The deep link information may be information for directly accessing resources used on the application execution screen. For example, the deep link information may be a direct link to the resources such as video, sound and image files related to the application execution screen. In addition, the deep link information may be information for accessing a sub page in a main page on the application execution screen.

Upon receiving a data upload request made by the user in operation 1604, the first electronic device A 1510 may upload data to the second sharing server 1530 in operation 1606.

The second sharing server 1530 store the uploaded data in operation 1608, and transmit a URL of the uploaded data, which makes it possible to access the uploaded data, to the first electronic device A 1510 in operation 1610.

In operation 1612, the first electronic device A 1510 may receive a sharing request for a URL of uploaded data from the user. Upon receiving the sharing request for a URL of uploaded data, the first electronic device A 1510 may select a transmission scheme for a URL of uploaded data in operation 1614. In accordance with an embodiment of the present disclosure, the transmission scheme for a URL of uploaded data may include at least one of an email transmission scheme, a message transmission scheme (SMS, MMS and the like), a chat message transmission scheme (e.g., ChatOn and the like), and a WIFI Direct transmission scheme. In addition, the transmission scheme may include any transmission scheme that may transmit a URL. In operation 1616, the first electronic device A 1510 may transmit the URL of the uploaded data to the second electronic device B 1520 using the selected transmission scheme.

Upon receiving the URL of the uploaded data, the second electronic device B 1520 may access the URL of the uploaded data in operation 1618, and download the uploaded data from the second sharing server 1530 in operation 1620. In operation 1622, the second electronic device B 1520 may share the data with the first electronic device A 1510 by storing the downloaded data.

In accordance with an embodiment of the present disclosure, if a web browser application execution screen (e.g., a web page screen) is captured, or if a partial image of the web page screen is captured by cropping an image of at least a part of the web page screen, the first electronic device A 1510 may upload data including the captured image and execution path information corresponding to the captured image, to the second sharing server 1530, receive a URL of the uploaded data from the second sharing server 1530, and provide the received URL to the second electronic device B 1520. For example, the first electronic device A 1510 may capture an image of at least a part of the web page screen in response to a user input during the display of the web page screen. In accordance with an embodiment of the present disclosure, the first electronic device A 1510 may capture an image of at least a part of the web page using an application (e.g., a SmartClip application) for performing a capture function in response to a user input. The first electronic device A 1510 may obtain execution path information corresponding to the captured image. The execution path information corresponding to the captured image may include information for executing a state of the captured image. In accordance with an embodiment of the present disclosure, the execution path information corresponding to the captured image may include metadata. The metadata may include a title corresponding to the web page, a URL for restoring the web page, a text corresponding to the web page, a data file (e.g., a music file, a video file or an image file) corresponding to the web page, drawing memo information corresponding to the web page, handwriting recognition result information corresponding to the web page, clip location information corresponding to the web page, and the like. In accordance with an embodiment of the present disclosure, the metadata may further include deep link information. The deep link information may be information for directly accessing resources used in the web page. For example, the deep link information may be a direct link to the resources such as video, sound and image files related to the web page. In addition, the deep link information may be information for accessing a sub page in a main page on the web page.

The first electronic device A 1510 may store the captured web page image and the execution path information corresponding to the captured web page image, as data in a predetermined format.

In accordance with an embodiment of the present disclosure, the data in a predetermined format may be data in an SCC format, or data in a format comprised of images and texts. In addition, the data including the captured image and the execution path information corresponding to the captured image may have any sharable data format. In accordance with an embodiment of the present disclosure, the data in a predetermined format may be stored in a DB related to a scrapbook application. The first electronic device A 1510 may receive the data to be uploaded to the second sharing server 1530, which is selected by the user from the data stored in the DB related to the scrapbook application. In accordance with an embodiment of the present disclosure, the first electronic device A 1510 may provide an option of allowing the user to select data to be uploaded. If the data to be uploaded is selected by the user, the first electronic device A 1510 may upload the data to the second sharing server 1530, and request a URL of the uploaded data. The second sharing server 1530 may store the uploaded data, generate a URL of the uploaded data, which makes it possible to access the uploaded data, and deliver the URL to the first electronic device A 1510. The first electronic device A 1510 may receive a sharing request for a URL of uploaded data from the user. Upon receiving the sharing request for a URL of uploaded data, the first electronic device A 1510 may select a sharing scheme for a URL of uploaded data. In accordance with an embodiment of the present disclosure, the sharing scheme for a URL of uploaded data may include at least one of an email transmission scheme, a message transmission scheme (SMS, MMS and the like), a chat message transmission scheme (e.g., ChatOn and the like), and a WIFI Direct transmission scheme. In addition, the transmission scheme may include any transmission scheme that may transmit a URL. The first electronic device A 1510 may transmit the URL of the uploaded data to the second electronic device B 1520 using the selected transmission scheme. The second electronic device B 1520 may receive a message including the URL of the uploaded data. The second electronic device B 1520 may execute a web browser application to access the URL of the uploaded data, and may access the URL of the uploaded data and download the data including the captured web page image and the execution path information corresponding to the captured web page image. The second electronic device B 1520 may store and execute the downloaded data including the captured web page image and the execution path information corresponding to the captured web page image. In accordance with an embodiment of the present disclosure, the second electronic device B 1520 may store the data including the captured web page image and the execution path information corresponding to the captured web page image, which is downloaded in a scrapbook application DB, and may display the web page screen using the execution path information corresponding to the web page image captured by the scrapbook application.

In accordance with an embodiment of the present disclosure, if a partial image is captured during the display of a video playback service application execution screen (e.g., a YouTube™ screen), the first electronic device A 1510 may upload data including the image of at least a part of the captured video playback service screen and the execution path information corresponding to the image of at least a part of the captured video playback service screen, to the second sharing server 1530 over the communication network 1501, and may receive a URL of the uploaded data from the second sharing server 1530 and provide the URL to the second electronic device B 1520.

For example, the first electronic device A 1510 may capture an image of at least a part of the video playback service screen using an application for performing a capture function in response to a user input. In the following description, the captured video playback service screen image or the partial image cropped from the captured video playback service screen image may be referred to as a captured image.

The first electronic device A 1510 may obtain execution path information corresponding to the captured image. The execution path information corresponding to the captured image may include information for executing a state of the captured image. In accordance with an embodiment of the present disclosure, the execution path information corresponding to the captured image may include metadata. The metadata may include a title corresponding to the video playback service, a URL for restoring the video playback service, a text corresponding to the video playback service, a data file (e.g., a music file, a video file or an image file) corresponding to the video playback service, drawing memo information corresponding to the video playback service, handwriting recognition result information corresponding to the video playback service, clip location information corresponding to the video playback service, and the like. In accordance with an embodiment of the present disclosure, the metadata may further include deep link information. The deep link information may be information for directly accessing videos used on the video playback service screen. For example, the deep link information may be a direct link to the video files related to the video playback service screen. In addition, the deep link information may be information for accessing a sub page in a main page on the video playback service screen.

The first electronic device A 1510 may store an image of at least a part of the captured video playback service screen and execution path information corresponding to the image of at least a part of the captured video playback service screen, as data in a predetermined format. In accordance with an embodiment of the present disclosure, the data in a predetermined format may be data in an SCC format, or data in a format comprised of images and texts. In addition, the data including the captured image and the execution path information corresponding to the captured image may have any sharable data format.

The first electronic device A 1510 may receive the data (e.g., the data including the image of at least a part of the captured video playback service screen and the execution path information corresponding to the image of at least a part of the captured video playback service screen) to be uploaded to the second sharing server 1530, which is selected by the user from the data stored in the DB related to the scrapbook application. In accordance with an embodiment of the present disclosure, the first electronic device A 1510 may provide an option of allowing the user to select data to be uploaded. If the data to be uploaded is selected by the user, the first electronic device A 1510 may upload the data to the second sharing server 1530, and request a URL of the uploaded data. The second sharing server 1530 may store the uploaded data, generate a URL of the uploaded data, which makes it possible to access the uploaded data, and deliver the URL to the first electronic device A 1510. The first electronic device A 1510 may receive a sharing request for a URL of uploaded data from the user. Upon receiving the sharing request for a URL of uploaded data, the first electronic device A 1510 may select a sharing scheme for a URL of uploaded data. In accordance with an embodiment of the present disclosure, the sharing scheme for a URL of uploaded data may include at least one of an email transmission scheme, a message transmission scheme (SMS, MMS and the like), a chat message transmission scheme (e.g., ChatOn and the like), and a WIFI Direct transmission scheme. In addition, the transmission scheme may include any transmission scheme that may transmit a URL. The first electronic device A 1510 may transmit the URL of the uploaded data to the second electronic device B 1520 using the selected transmission scheme. The second electronic device B 1520 may receive a message including the URL of the uploaded data. The second electronic device B 1520 may execute a web browser application to access the URL of the uploaded data, and may access the URL of the uploaded data through the web browser, and download the data including the image of at least a part of the captured video playback service screen and the execution path information corresponding to the image of at least a part of the captured video playback service screen. The second electronic device B 1520 may store and execute the downloaded data including the image of at least a part of the captured video playback service screen and the execution path information corresponding to the image of at least a part of the captured video playback service screen. In accordance with an embodiment of the present disclosure, the second electronic device B 1520 may store the image of at least a part of the captured video playback service screen and the execution path information corresponding to the image of at least a part of the captured video playback service screen, which are downloaded in a scrapbook application DB, and may display the video service screen using the execution path information corresponding to the image of at least a part of the video playback service screen captured by the scrapbook application.

In accordance with an embodiment of the present disclosure, if an image of at least a part of, for example, the music playback screen is captured during the display of a music playback application execution screen, the first electronic device A 1510 may upload the data including the image of at least a part of the captured music playback screen and the execution path information corresponding to the image of at least a part of the captured music playback screen, to the second sharing server 1530, and may receive a URL of the uploaded data from the second sharing server 1530 and provide the URL to the second electronic device B 1520.

For example, the first electronic device A 1510 may capture an image of at least a part of the music playback application execution screen using an application for performing a capture function in response to a user input. In the following description, the entire image of the captured music playback screen or a partial image cropped from the captured music playback screen may be referred to as a captured image.

The first electronic device A 1510 may obtain execution path information corresponding to the captured image. The execution path information corresponding to the captured image may include information for executing a state of the captured image. In accordance with an embodiment of the present disclosure, the execution path information corresponding to the captured image may include metadata. The metadata may include a title corresponding to the music playback screen, a URL for restoring the music playback screen, a text corresponding to the music playback screen, a data file (e.g., a music file, a video file or an image file) corresponding to the music playback screen, drawing memo information corresponding to the music playback screen, handwriting recognition result information corresponding to the music playback screen, clip location information corresponding to the music playback screen, and the like. In accordance with an embodiment of the present disclosure, the metadata may further include deep link information. The deep link information may be information for directly accessing a music file used on the music playback screen. For example, the deep link information may be a direct link to the resources such as video, sound and image files related to the music playback screen. In addition, the deep link information may be information for accessing a sub page in a main page on the music playback screen.

The first electronic device A 1510 may store the image of at least a part of the captured music playback screen and the execution path information corresponding to the image of at least a part of the captured music playback screen, as data in a predetermined form. In accordance with an embodiment of the present disclosure, the first electronic device A 1510 may include or insert the original audio file corresponding to the music playback screen into the data together with the image of at least a part of the captured music playback screen and the execution path information corresponding to the image of at least a part of the captured music playback screen. In accordance with an embodiment of the present disclosure, the data in a predetermined format may be data in an SCC format, or data in a format comprised of images and texts. In addition, the data including the captured image and the execution path information corresponding to the captured image may have any sharable data format. In accordance with an embodiment of the present disclosure, the data in a predetermined format may be stored in a DB related to a scrapbook application.

The first electronic device A 1510 may receive the data (e.g., the data including the image of at least a part of the captured music playback screen and the execution path information corresponding to the image of at least a part of the captured music playback screen or the data including the image of at least a part of the captured music playback screen, the execution path information corresponding to the image of at least a part of the captured music playback screen and the audio file) to be uploaded to the second sharing server 1530, which is selected by the user from the data stored in the DB related to the scrapbook application. In accordance with an embodiment of the present disclosure, the first electronic device A 1510 may provide an option of allowing the user to select data to be uploaded. If the data to be uploaded is selected by the user, the first electronic device A 1510 may upload the data to the second sharing server 1530, and request a URL of the uploaded data. The second sharing server 1530 may store the uploaded data, generate a URL of the uploaded data, which makes it possible to access the uploaded data, and deliver the URL to the first electronic device A 1510. The first electronic device A 1510 may receive a sharing request for a URL of uploaded data from the user. Upon receiving the sharing request for a URL of uploaded data, the first electronic device A 1510 may select a sharing scheme for a URL of uploaded data. In accordance with an embodiment of the present disclosure, the sharing scheme for a URL of uploaded data may include at least one of an email transmission scheme, a message transmission scheme (SMS, MMS and the like), a chat message transmission scheme (e.g., ChatOn and the like), and a WIFI Direct transmission scheme. In addition, the transmission scheme may include any transmission scheme that may transmit a URL. The first electronic device A 1510 may transmit the URL of the uploaded data to the second electronic device B 1520 using the selected transmission scheme. The second electronic device B 1520 may receive a message including the URL of the uploaded data. The second electronic device B 1520 may execute a web browser application to access the URL of the uploaded data, and may access the URL of the uploaded data through the web browser, and download the data including the image of at least a part of the captured music playback screen and the execution path information corresponding to the image of at least a part of the captured music playback screen, or the data including the image of at least a part of the captured music playback screen, the execution path information corresponding to the image of at least a part of the captured music playback screen, and the audio file. The second electronic device B 1520 may store and execute the downloaded data including the image of at least a part of the captured music playback screen and the execution path information corresponding to the image of at least a part of the captured music playback screen, or the downloaded data further including the audio file. In accordance with an embodiment of the present disclosure, the second electronic device B 1520 may store the data including the image of at least a part of the captured music playback screen and the execution path information corresponding to the image of at least a part of the captured music playback screen, which is downloaded in a scrapbook application DB, and may play the music using the execution path information corresponding to the image of at least a part of the music playback screen captured by the scrapbook application.

Figure 17:
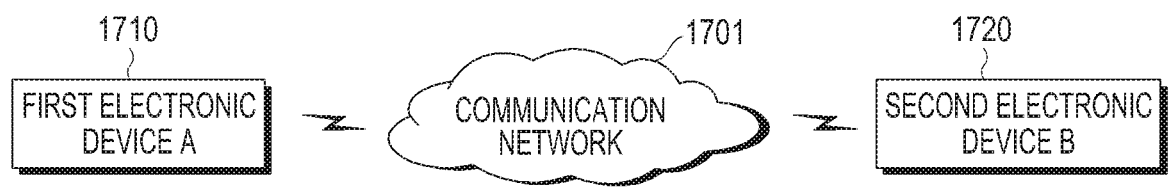
FIG. 17 illustrates the concept of sharing a captured image and execution path information corresponding to the captured image according to a third embodiment of the present disclosure.

FIG. 17 illustrates the concept of sharing a captured image and execution path information corresponding to the captured image according to a third embodiment of the present disclosure.

Referring to FIG. 17, a first electronic device A 1710 may share data including an image that is captured from an application execution screen during the execution of an application, and execution path information corresponding to the captured image, by directly delivering the data to a second electronic device B 1720 over a communication network 1701. In accordance with an embodiment of the present disclosure, the first electronic device A 1710 may deliver the data including the captured image and the execution path information corresponding to the captured image to the second electronic device B 1720 as the captured image's original data in a format comprised of images and texts, or may deliver the data including the captured image and the execution path information corresponding to the captured image by converting the data into data in a predetermined format (e.g., an SCC format).

Figure 18:
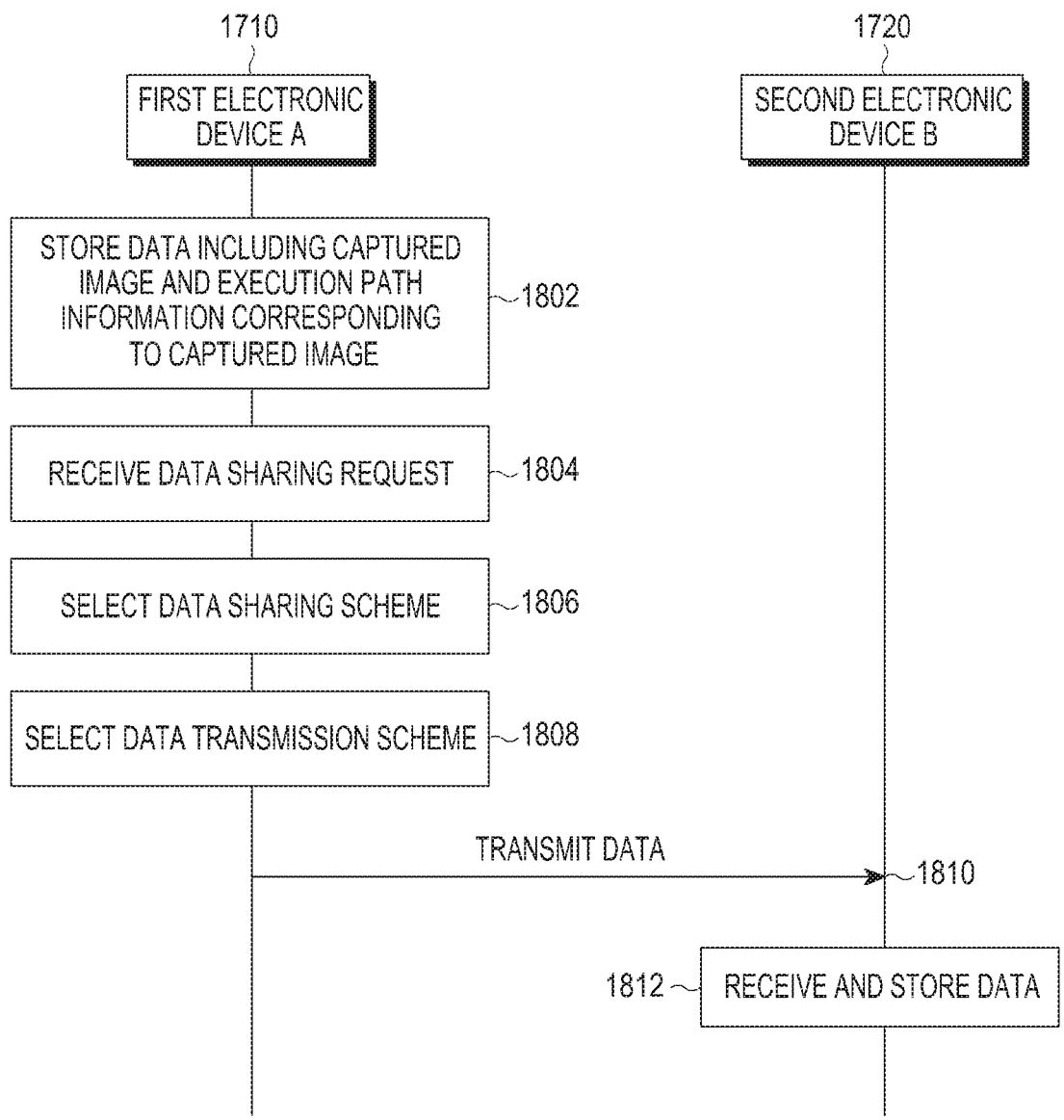
FIG. 18 illustrates an operation of sharing a captured image and execution path information corresponding to the captured image between electronic devices according to the third embodiment of the present disclosure.

FIG. 18 illustrates an operation of sharing a captured image and execution path information corresponding to the captured image between electronic devices according to a third embodiment of the present disclosure.

Referring to FIG. 18, in operation 1802, the first electronic device A 1710 may store the data including an image captured from an application execution screen and execution path information corresponding to the captured image. In accordance with an embodiment of the present disclosure, the first electronic device A 1710 may store the captured image and the execution path information corresponding to the captured image, as data in a predetermined format. In accordance with an embodiment of the present disclosure, the data in a predetermined format may be data in an SCC format, or data in a format comprised of images and texts. In addition, the data including the captured image and the execution path information corresponding to the captured image may have any sharable data format.

In accordance with an embodiment of the present disclosure, the execution path information corresponding to the captured image may include metadata. The metadata may include a title corresponding to the application execution screen, a URL for restoring the application execution screen, a text corresponding to the application execution screen, a data file (e.g., a music file, a video file or an image file) corresponding to the application execution screen, drawing memo information corresponding to the application execution screen, handwriting recognition result information corresponding to the application execution screen, clip location information corresponding to the application execution screen, and the like. In accordance with an embodiment of the present disclosure, the metadata may further include deep link information. The deep link information may be information for directly accessing resources used on the application execution screen. For example, the deep link information may be a direct link to the resources such as video, sound and image files related to the application execution screen. In addition, the deep link information may be information for accessing a sub page in a main page on the application execution screen.

In operation 1804, the first electronic device A 1710 may receive a sharing request for the data including the captured image and the execution path information corresponding to the captured image, the sharing request being made by a user input.

Upon receiving the data sharing request from the user, the first electronic device A 1710 may select a data sharing scheme in operation 1806. In accordance with an embodiment of the present disclosure, the first electronic device A 1710 may determine whether to share the data including the captured image and the execution path information corresponding to the captured image as the captured image's original data, or whether to share the data including the captured image and the execution path information corresponding to the captured image by converting the data into data in a predetermined format. In accordance with an embodiment of the present disclosure, if the data is shared as the data's original data, the first electronic device A 1710 may share the original captured image (e.g., an image in a PNG format or an image in a JPG format), and the execution path information corresponding to the captured image in a text format. If the data is shared by converting the data into data in a predetermined format, the first electronic device A 1710 may share the original captured image (e.g., an image in a PNG format or an image in a JPG format) and the execution path information corresponding to the captured image by converting them into one file (e.g., an SCC file).

In operation 1808, the first electronic device A 1710 may select a data transmission scheme. In accordance with an embodiment of the present disclosure, the first electronic device A 1710 may allow the user to select any one of a plurality of data transmission schemes, for the data including the captured image and the execution path information corresponding to the captured image. In accordance with an embodiment of the present disclosure, the data transmission scheme may be at least one of various transmission schemes such as an email transmission scheme, a message transmission scheme (SMS, MMS and the like), a chat message transmission scheme (e.g., ChatOn and the like), a WIFI Direct transmission scheme and the like. In addition, the data transmission scheme may include any scheme that may transmit data.

In operation 1810, the first electronic device A 1710 may transmit the data including the captured image and the execution path information corresponding to the captured image to the second electronic device B 1720. In accordance with an embodiment of the present disclosure, the first electronic device A 1710 may transmit the data including the captured image and the execution path information corresponding to the captured image to the second electronic device B 1720 using the selected data sharing scheme and the selected data transmission scheme.

In operation 1812, the second electronic device B 1720 may receive and store the data including the captured image and the execution path information corresponding to the captured image from the first electronic device A 1710, thereby sharing the data including the captured image and the execution path information corresponding to the captured image with the first electronic device A 1710.

In accordance with various embodiments of the present disclosure, the electronic device 100 may provide a variety of user interface screens to share the captured image and the execution path information corresponding to the captured image.

FIGS. 19A to 22D illustrate user interface screens for sharing a captured image and execution path information corresponding to the captured image in an electronic device according to an embodiment of the present disclosure.

Figures 19A, 19B, 19C:
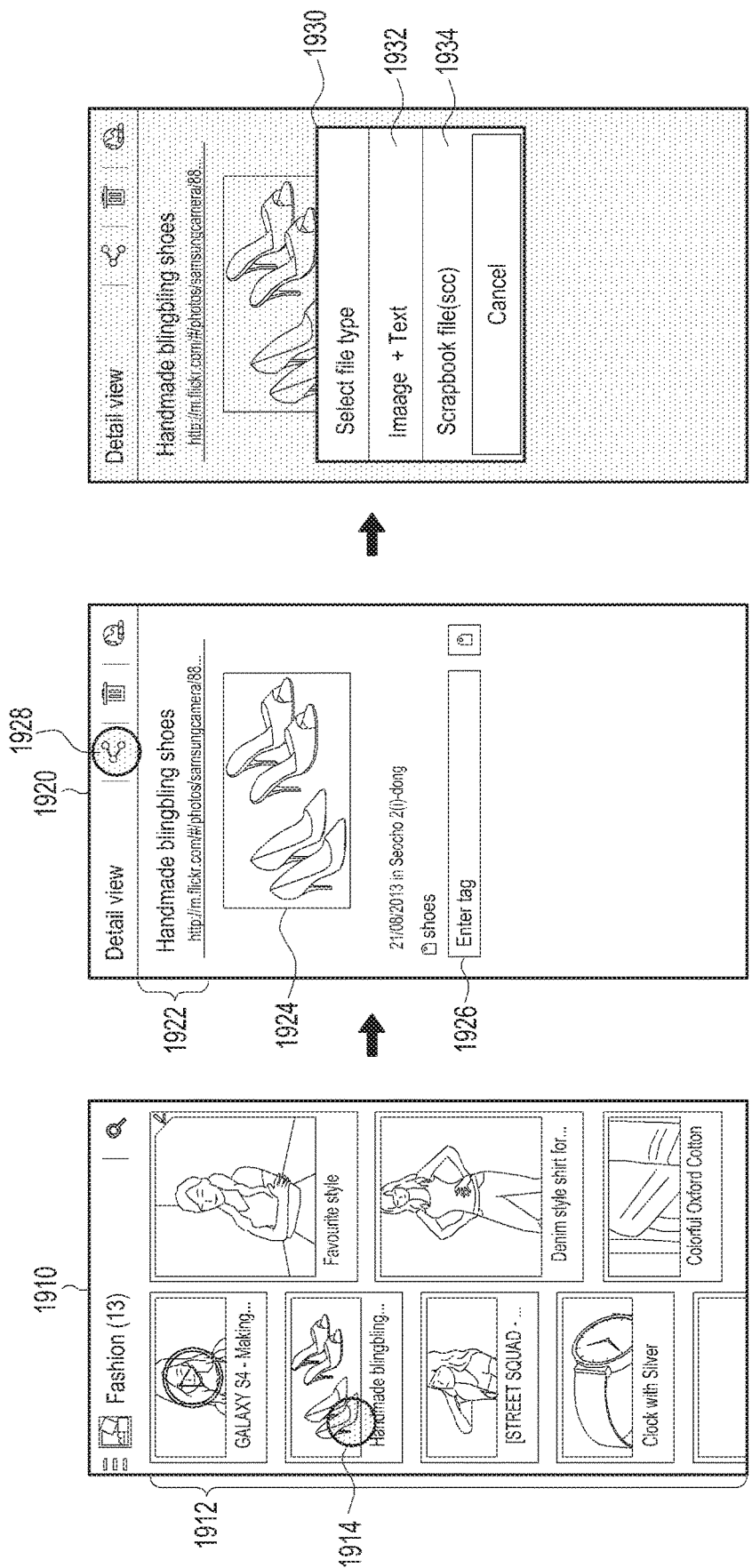

Referring to FIGS. 19A to 19C, the electronic device 100 may display data (hereinafter referred to as 'scrap data') 1912 including images captured from a scrapbook application execution screen 1910 and execution path information corresponding to the captured images as illustrated in FIG. 19A. The user may select scrap data 1914 that the user desires to share, from among the scrap data 1912 displayed on the scrapbook application execution screen 1910.

If the scrap data that the user desires to share is selected by the user, the electronic device 100 may display a scrap data screen 1920 indicating a captured image 1924 of the selected scrap data and execution path information 1922 corresponding to the captured image as illustrated in FIG. 19B. On the scrap data screen 1920 may be further displayed an input window 1926 in which the user may add tag information to the scrap data, and a share icon 1928 by which the user may request sharing of scrap data.

If the share icon 1928 is selected by the user, the electronic device 100 may display a file format selection window 1930 through which the user may select the file format in which the scrap data is to be shared, as illustrated in FIG. 19C. The file format selection window 1930 may include file formats such as a file format 1932 consisting of images and texts, and a SCC format 1934, and the like. The user may select the file format of the scrap data in the file format selection window 1930.

Referring to FIGS. 20A to 20C, the electronic device 100 may allow the user to select a file format 2012 consisting of images and texts in a file format selection window 2010 as illustrated in FIG. 20A. If the file format 2012 consisting of images and texts is selected, the electronic device 100 may display a transmission scheme selection window 2020 through which the user may select a scrap data transmission scheme, as illustrated in FIG. 20B. In the transmission scheme selection window 2020 may be displayed icons corresponding to various transmission schemes such as an email transmission scheme, a message transmission scheme (SMS, MMS and the like), a chat message transmission scheme (e.g., ChatOn and the like), a WIFI Direct transmission scheme and the like. The user may select a transmission scheme of the scrap data in the transmission scheme selection window 2020. If a message transmission scheme 2022 is selected from the various transmission schemes, the electronic device 100 may execute a message transmission application and display a message transmission application screen 2030 as illustrated in FIG. 20C. The electronic device 100 may include or insert the scrap data in an attachment area 2034 on the message transmission application screen 2030, and may receive a user's message through a message writing area 2032 and transmit the scrap data to a target electronic device with which the electronic device 100 will share the scrap data, using the message transmission scheme.

Figures 21A, 21B, 21C:
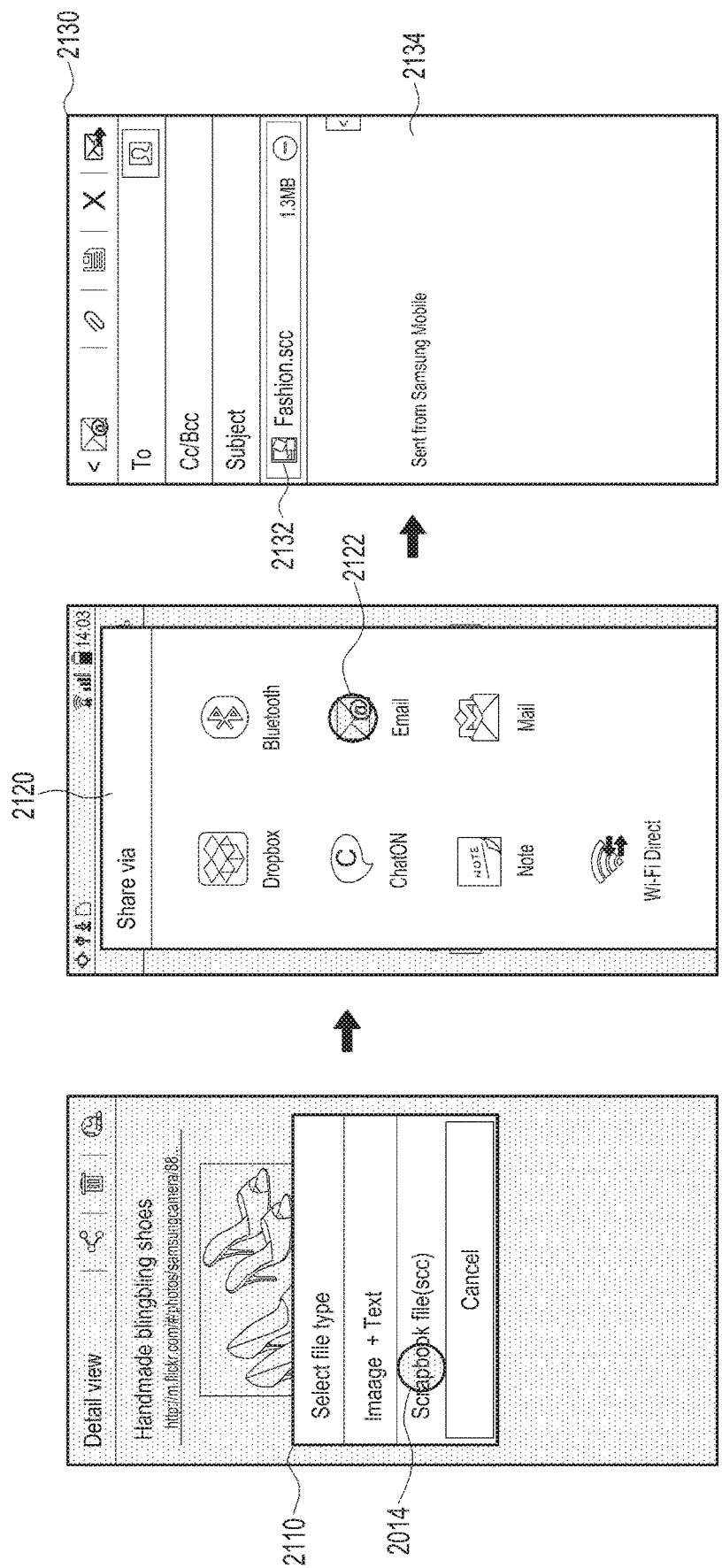

Referring to FIGS. 21A to 21C, the electronic device 100 may allow the user to select an SCC format 2014 in a file format selection window 2110 as illustrated in FIG. 21A. If the SCC format 2014 is selected, the electronic device 100 may display a transmission scheme selection window 2120 through which the user may select a scrap data transmission scheme, as illustrated in FIG. 21B. In the transmission scheme selection window 2120 may be displayed icons corresponding to various transmission schemes such as an email transmission scheme, a message transmission scheme (SMS, MMS and the like), a chat message transmission scheme (e.g., ChatOn and the like), a WIFI Direct transmission scheme and the like. The user may select a transmission scheme of the scrap data in the transmission scheme selection window 2120. If an email transmission scheme 2122 is selected from the various transmission schemes, the electronic device 100 may execute an email transmission application and display an email transmission application screen 2130 as illustrated in FIG. 21C. The electronic device 100 may include or insert the scrap data in an attachment area 2132 on the email transmission application screen 2130, and may receive the email contents from the user through an email writing area 2134 and transmit the scrap data to a target electronic device with which the electronic device 100 will share the scrap data, using the email transmission scheme.

Referring to FIGS. 22A to 22D, the electronic device 100 may receive and store scrap data from another electronic device using various transmission schemes, thereby sharing the scrap data. In accordance with an embodiment of the present disclosure, upon receiving scrap data through the email transmission scheme, the electronic device 100 may store scrap data 2212 included in an attached file on an email reception screen 2210 by selecting a Save button 2214 as illustrated in FIG. 22A. If the Save button 2214 for scrap data is selected, the electronic device 100 may store scrap data 2222 through a data storage screen 2220 as illustrated in FIG. 22B. If the stored scrap data 2222 is selected, the electronic device 100 may display a category selection screen 2230 through which the user may select a category in which the user will store the scrap data, as illustrated in FIG. 22C. If a category 2232 (e.g., 'New') is selected by the user on the category selection screen 2230, the electronic device 100 may store scrap data 2242 in the 'New' category as illustrated on a screen 2240 in FIG. 22D, thereby sharing the scrap data 2242 with a receiving electronic device.

In accordance with an embodiment of the present disclosure, the scrap data may correspond to an SCC file.

Figure 23:
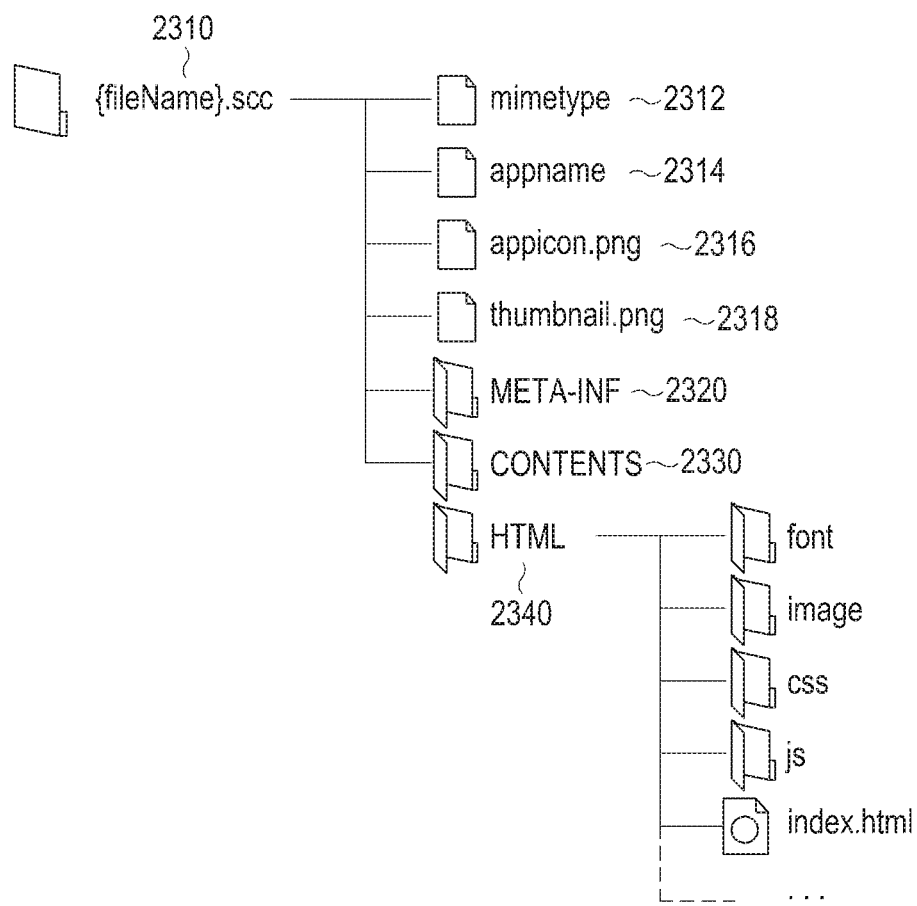
FIG. 23 illustrates an SCC file structure according to an embodiment of the present disclosure.

FIG. 23 illustrates an SCC file structure according to an embodiment of the present disclosure.

Referring to FIG. 23, an SCC file may be a file such as 'fileName.SCC' 2310. The SCC file may include 'mimetype' 2312, 'appname' 2314, 'appicon.png' 2316, 'thumbnail.png' 2318, 'META-INF' 2320, 'CONTENTS' 2330, and 'HTML' 2340.

The 'mimetype' 2312 may be information indicating a name of each application. For example, the 'mimetype' 2312, which is information obtained by attaching a name of each application to the back of a prefix given as 'application/vnd.samsung. SCC.', may be 'Scrapbook:application/vnd.samsung.SCC.pinall'.

The 'appname' 2314, which is a text file without an extension, may be an application name corresponding to scrap data. An application name may be displayed in an integrated viewer.

The 'appicon.png' 2316 may be an icon file of an application, which corresponds to the scrap data. The icon may be displayed in the integrated viewer.

The 'thumbnail.png' 2318 may be a thumbnail image of the scrap data. The image file may also be a 'jpg' file other than the 'png' file.

The 'META-INF' 2320, which is information about the location where metadata is stored, may include metadata. The information about the location where metadata is stored may be provided to the application. The metadata may have a format of XML and JavaScript Object Notation (JSON) files. Configuration of each of the XML and JSON files and a format in the files may be defined in each application.

The 'CONTENTS' 2330 may correspond to the location where the original multimedia files are stored, and the original files of, for example, image, audio and video files may be linked through relative paths in a HyperText Markup Language (HTML) file.

The 'HTML' 2340 may correspond to an HTML file and the resources (e.g., font, scc, js and the like) that are used in the HTML file so that a screen may be configured in the integrated viewer. An HTML folder may include index.html which is an essential file, and other additionally required html files may also be stored therein. HTML may comply with the HTML5 standard or the SCC standard, and support JavaScript.

FIG. 24 illustrates META-INF 2320 included in an SCC file according to an embodiment of the present disclosure.

Referring to FIG. 24, the META-INF 2320 may be configured in a JSON file structure. The META-INF 2320 may include a category name 2402, a content start (e.g., a start of scrap data) 2404, a content type (e.g., a type of scrap data) 2406, a thumbnail image path 2408, a captured image path 2410, a captured image width 2412, a captured image height 2414, an image-captured time 2416, a captured image's crop shape 2418 (e.g., 0: scribble, 1: square, 2: auto-calibration during scribbling, 3: cropping by scrapbooker, and the like), and metadata 2420 including a meta key 2422.

FIG. 25 illustrates metadata according to an embodiment of the present disclosure.

Referring to FIG. 25, the metadata may be divided into a meta key 2510, a meta value 2520, and a meta value type 2530. The meta key 2510 may be a key indicating the type of the metadata. The meta value 2520 may be a value corresponding to the key indicating the type of each metadata. The meta value type 2530 may be a data type of the key indicating the type of the metadata. In accordance with an embodiment of the present disclosure, the key indicating the type of the metadata may include 'title', 'plain text', 'app_deep_link', 'url', 'file_path_audio', 'file_path_video', 'file_path_image', 'file_path_drawing_memo', 'file_path_spd', 'dm_hand_write_text', and 'location'.

The 'title' may be a title corresponding to an application execution screen corresponding to the captured image. The 'plain text' may be a text corresponding to the captured image. The 'app_deep_link' may be a URL for restoring an application execution screen corresponding to the captured image. The 'url' may be url information obtained from the captured image. The 'file_path_audio', 'file_path_video', or 'file_path_image' may be a path of the original data file (e.g., audio file, video file or image file) related to an application execution screen corresponding to the captured image. The 'file_path_drawing_memo' may be drawing memo information corresponding to the captured image. The 'file_path_spd' may be drawing memory path information. The 'dm_hand_write_text' may be handwriting recognition result information corresponding to the captured image. The 'location' may be clip location information corresponding to the captured image.

In accordance with the above-described various embodiments of the present disclosure, an electronic device of a user may share the captured screen image and execution path information used for executing the screen that was displayed during the screen capture, with another electronic device of the same user or an electronic device of another user, thereby making it possible to execute the screen that was displayed during the screen capture using the captured screen image even in another electronic device of the same user or an electronic device of another user.

The methods according to various embodiments of the present disclosure may be implemented in the form of program commands that may be executed through various computer means, and then written in a computer-readable recording medium. The computer-readable recording medium may include program commands, data files, data structure and the like alone or in combination. The program commands written in the medium may be program commands that are designed and configured especially for the present disclosure, or program commands that are known to those skilled in the art of the computer software.

It may be appreciated that the method for using a captured image according to an embodiment of the present disclosure may be implemented in the form of hardware, software or a combination thereof. The software may be stored in a volatile or non-volatile storage (e.g., erasable/re-writable ROM), a memory (e.g., RAM, memory chip, memory device, memory Integrated Circuit (IC), or the like), or an optically or magnetically recordable machine (e.g., computer)-readable storage medium (e.g., CD, DVD, magnetic disk, magnetic tape and the like). The method for using a captured image according to an embodiment of the present disclosure may be implemented by a computer or an electronic device, which includes a controller and a memory. It will be apparent to those of ordinary skill in the art that the memory may be an example of a machine-readable storage medium suitable to store a program (or programs) including instructions for implementing embodiments of the present disclosure. Therefore, embodiments of the present disclosure may include a program including codes for implementing the apparatus and method as defined by the appended claims, and a machine (or computer and the like)-readable storage medium storing the program.

As is apparent from the foregoing description, in accordance with various embodiments of the present disclosure, if a user captures a screen while watching screens associated with execution of an application, the electronic device may store an image of the entire or at least a part of the captured screen together with execution path information for executing a state of the captured screen, thereby making it possible for the user to execute the state of the captured screen using the captured screen.

For example, if the user selects an image of the entire or at least a part of the stored web page screen, the electronic device may execute a state of the web page screen, so the user may omit the user input operation of executing a web browser to execute a state of the web page screen and entering a web page address on the web browser. If the user selects an image of the entire or at least a part of the stored music playback screen, the electronic device may execute a state of the music playback screen, so the user may omit the user input operation of executing a music playback application to execute a state of the music playback screen and selecting music to be played in the music playback application. If the user selects an image of the entire or at least a part of the stored clip screen image, the electronic device may execute a state of the clip screen, so the user may omit the user input operation of executing a clip application to display a clip screen and selecting a clip screen to be displayed in the clip application.

In accordance with various embodiments of the present disclosure, an electronic device of a user may share the captured screen image and execution path information used for executing the screen that was displayed during the screen capture, with another electronic device of the same user or an electronic device of another user, thereby making it possible to execute the screen that was displayed during the screen capture using the captured screen image even in another electronic device of the same user or an electronic device of another user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display; and
a processor configured to:
display an application execution screen of an application based on executing the application; and
when a screen image of the application execution screen is captured:
obtain execution state information of the application corresponding to what is being displayed on the display at the time when the captured screen image is captured, obtain a cropped image of the captured screen image in response to a drawing input on the captured screen image, and store the cropped image and the execution state information,
wherein the stored execution state information includes execution path information for the electronic device to, upon selection by a user input of the cropped image at a later time, execute the application and place the electronic device in an execution state of the application at the time when the captured screen image is captured,
wherein the application includes music playback application, and the stored execution state information further includes a music playback point at the time when the captured screen image is captured.

2. The electronic device of claim 1, wherein the execution state information corresponds to information indicative of one or more applications, web pages, or files being displayed or played by the electronic device at the time when the captured screen image is captured.

3. The electronic device of claim 1, wherein the execution state information comprises metadata.

4. The electronic device of claim 3, wherein the metadata comprises at least one of a title corresponding to the application execution screen, a Uniform Resource Locator (URL) for restoring the application execution screen, a text corresponding to the application execution screen, a content file corresponding to the application execution screen, drawing memo information corresponding to the application execution screen, handwriting recognition result information corresponding to the application execution screen, and clip location information corresponding to the application execution screen.

5. The electronic device of claim 3,
wherein the metadata further comprises link information, and wherein the link information comprises information for directly accessing resources used on the application execution screen.

6. The electronic device of claim 5, wherein the link information further comprises information for accessing a sub page in a main page on the application execution screen.

7. The electronic device of claim 1, further comprising: a communication unit configured to transmit the cropped image and the stored execution state information to share the cropped image and the stored execution state information.

8. The electronic device of claim 1, wherein the cropped image comprises one of an entire image of the captured screen image or a partial image of the captured screen image.

9. The electronic device of claim 1, wherein the cropped image comprises an image included in a closed figure by the drawing input on the captured screen image.

10. The electronic device of claim 1, wherein the cropped image and the execution state information are stored as data in a predetermined format.

11. The electronic device of claim 10, wherein the data in the predetermined format is data in one of a scrapbook file (SCC) format or a format comprised of an image and text.

12. A method for using a captured screen in an electronic device, the method comprising:
  capturing a screen image of an application execution screen of an application;
  obtaining execution state information corresponding to what is being displayed on the display at the time when the captured screen image is captured;
  obtaining a cropped image of the captured screen image in response to a drawing input on the captured screen image; and
  storing the cropped image and the execution state information,
  wherein the stored execution state information includes execution path information for the electronic device to, upon selection by a user input of the cropped image at a later time, execute the application and place the electronic device in an execution state of the application at the time when the captured screen image is captured,
  wherein the application includes a music playback application, and the stored execution state information further includes a music playback point at the time when the captured screen image is captured.

13. The method of claim 12, wherein the execution state information corresponds to information indicative of one or more applications, web pages, or files being displayed or played by the electronic device at the time when the captured screen image is captured.

14. The method of claim 12, further comprising transmitting the cropped image and the execution state information to share.

15. The method of claim 12, wherein the cropped image comprises one of an entire image of the captured screen image or a partial image of the captured screen image.

16. The method of claim 12, wherein the cropped image comprises an image included in a closed figure by the drawing input on the captured screen image.

17. The method of claim 12, wherein the cropped image and the execution state information are stored as data in a predetermined format.

18. The method of claim 17, wherein the data in the predetermined format is data in one of a scrapbook file (SCC) format or a format comprised of an image and text.

19. A non-transitory storage medium configured to store one or more computer programs for using a screen image, the one or more computer programs including instructions that, when executed by at least one processor of an electronic device, cause the at least one processor to control for:
  capturing a screen image of an application execution screen of an application;
  obtaining execution state information corresponding to what is being displayed on the display at the time when the captured screen image is captured;
  obtaining a cropped image of the captured screen image in response to a drawing input on the captured screen image; and
  storing the cropped image and the execution state information,
  wherein the stored execution state information includes execution path information for the electronic device to, upon selection by a user input of the cropped image at a later time, execute the application and place the electronic device in an execution state of the application at the time when the captured screen image is captured,
  wherein the application includes a music playback application, and the stored execution state information includes a music playback point at the time when the captured screen image is captured.

* * * * *